(12) United States Patent
Kalverkamp et al.

(10) Patent No.: US 11,805,717 B2
(45) Date of Patent: Nov. 7, 2023

(54) SELF-PROPELLED MACHINE

(71) Applicant: Kalverkamp Innovation GmbH, Rieste (DE)

(72) Inventors: Felix Kalverkamp, Vorden (DE); Klemens Kalverkamp, Damme (DE)

(73) Assignee: Kalverkamp Innovation GmbH, Rieste (DE)

( * ) Notice: Subject to any disclaimer, the term of this patent is extended or adjusted under 35 U.S.C. 154(b) by 759 days.

(21) Appl. No.: 16/635,832

(22) PCT Filed: Jul. 31, 2018

(86) PCT No.: PCT/EP2018/070798
§ 371 (c)(1),
(2) Date: Jan. 31, 2020

(87) PCT Pub. No.: WO2019/025466
PCT Pub. Date: Feb. 7, 2019

(65) Prior Publication Data
US 2020/0221625 A1    Jul. 16, 2020

(30) Foreign Application Priority Data

Aug. 1, 2017 (DE) .......................... 102017007265.5
Jul. 19, 2018 (DE) .......................... 202018104162.2

(51) Int. Cl.
*A01B 51/02* (2006.01)
*B62D 49/06* (2006.01)
*B62D 55/04* (2006.01)

(52) U.S. Cl.
CPC ........ *A01B 51/023* (2013.01); *B62D 49/0607* (2013.01); *B62D 49/0635* (2013.01);
(Continued)

(58) Field of Classification Search
CPC .............. A01B 51/023; B62D 49/0607; B62D 49/0635; B62D 49/0678; B62D 49/065; B62D 55/04
See application file for complete search history.

(56) References Cited

U.S. PATENT DOCUMENTS

| 3,825,087 A | 7/1974 | Wilson |
| 4,164,985 A | 8/1979 | Bobard |
(Continued)

FOREIGN PATENT DOCUMENTS

| AU | PM851294 | 10/1994 |
| AU | 3986295 A | 6/1999 |
(Continued)

OTHER PUBLICATIONS

International Search Report dated Nov. 21, 2018; International Application No. PCT/EP2018/070798 filed Jul. 31, 2018.

*Primary Examiner* — Bryan A Evans
(74) *Attorney, Agent, or Firm* — DINSMORE & SHOHL LLP

(57) ABSTRACT

A self-propelled machine for agriculture forms an agricultural gantry system. The machine has a support structure for receiving attachment devices, at least one drive unit with a control module, a support structure forming an agricultural gantry system and a plurality of ground supports for moving the support structure. The agricultural gantry system is convertible from a road orientation defining a driving width (FB) to a working orientation having a substantially larger working width (AB).

20 Claims, 23 Drawing Sheets

(52) U.S. Cl.
CPC ........ *B62D 49/0678* (2013.01); *B62D 49/065* (2013.01); *B62D 55/04* (2013.01)

(56) References Cited

U.S. PATENT DOCUMENTS

| | | | |
|---|---|---|---|
| 5,092,422 A | 3/1992 | Hood, Jr. et al. | |
| 6,029,431 A * | 2/2000 | Dowler | A01B 51/023 |
| | | | 180/234 |
| 2017/0164548 A1* | 6/2017 | Bassett | A01B 69/008 |
| 2019/0053417 A1* | 2/2019 | Beaujot | A01B 51/02 |

FOREIGN PATENT DOCUMENTS

| | | |
|---|---|---|
| CN | 101361424 A | 2/2009 |
| CN | 101558706 A | 10/2009 |
| CN | 103109607 A | 5/2013 |
| CN | 103847832 A | 6/2014 |
| CN | 103863434 A | 6/2014 |
| CN | 203751446 U | 8/2014 |
| CN | 104053353 A | 9/2014 |
| CN | 104081901 A | 10/2014 |
| CN | 203851446 U | 10/2014 |
| CN | 203996849 U | 12/2014 |
| CN | 104838772 A | 8/2015 |
| CN | 106258031 A | 1/2017 |
| CN | 106241160 B | 11/2018 |
| CN | 105102299 B | 3/2019 |
| DE | 2133779 A1 | 4/1972 |
| DE | 2443915 A1 | 4/1976 |
| DE | 3911524 A1 | 10/1990 |
| EP | 0331070 A1 | 9/1989 |
| EP | 0793411 A1 | 9/1997 |
| EP | 0796411 A1 | 9/1997 |
| FR | 2343411 | 10/1977 |
| GB | 1578857 A | 11/1980 |
| WO | 9007866 A2 | 7/1990 |
| WO | 9615656 A1 | 5/1996 |
| WO | 1996015656 A1 | 5/1996 |
| WO | 0123241 A2 | 4/2001 |
| WO | 2011114016 A1 | 9/2011 |

* cited by examiner

Fig. 17

SELF-PROPELLED MACHINE

CROSS-REFERENCE TO RELATED APPLICATIONS

This application is the U.S. national stage of PCT/EP2018/070798 filed Jul. 31, 2018, which claims priority of German Patent Application 10 2017 007 265.5 filed Aug. 1, 2017 and German Patent Application 20 2018 104 162.2 filed Jul. 19, 2018 all of which are hereby incorporated by reference in their entirety.

FIELD OF INVENTION

The invention is directed to a self-propelled working machine which can be used in agriculture for variable processing techniques.

BACKGROUND OF THE INVENTION

Such multifunctional machines for agriculture have been known for a long time, wherein respective carrier vehicles can be converted for different purposes. In DE 21 33 779, a carrier vehicle for receiving a harvesting device is proposed, wherein this basic vehicle can in principle also be used for further applications. A concept is thereby established in which a bridge-like component can receive the respective attachment devices via coupling elements. This construction which realises a "bridge concept" in the manner of a gantry system is also possible with solutions according to U.S. Pat. Nos. 5,092,422, 4,164,985, DE 39 11 524, WO 01/23241, WO 2011/114016 and CN 203851446.

Further known constructions are directed at substantially one-piece supports, wherein the chassis is provided as a central frame. Such solutions are shown in EP 0 331 070, DE 24 43 915, U.S. Pat. No. 3,825,087 and WO 90/07866. Also, in EP 0 793 411 a system is disclosed with a convertible chassis or a double-T-shaped frame structure. An elongated central section of this support structure is in this case provided at the end with in each case one section carrying the drive wheels. These lateral sections have upper surfaces which are substantially coplanar with the upper surface of the central portion. GB 1578857 A also comprises a three-part system with a central longitudinal frame and end-side chassis with diagonal struts.

With regard to these agricultural constructions known as gantry systems, it was found that when the respective support structure is equipped with varying units in the case of a series processing of agricultural areas preferred in agriculture, disadvantageous conversion cost are incurred and road transportation of the systems with mounted units can be carried out only to a limited extent.

SUMMARY OF THE INVENTION

The object of the concept according to the invention is to provide a multifunctional agricultural working machine, in which an optimum structure with variable attachment areas enables a universal coupling of attachment devices, whereby the drive and control units can be integrated into the overall system and thus the conditions for the fully autonomous use are improved both for agricultural applications and for respective phases of road transportation.

The implementation according to the invention of the self-propelled working machine for land technology starts from the fact that a support structure which can be positioned in the road orientation with the respective end-side ground supports—which are preferably provided in the form of pairs of wheels or tracks arranged opposite one another in pairs—now defines a vertical longitudinal centre plane extending in the longitudinal direction of the system substantially between these ground supports.

The support structure is developed and optimised conceptually in alignment with this—regarded as the inventive basis of a new component combination—position of a vertical longitudinal centre plane known per se. This now forms a functional frame provided with at least one base carrier which can be positioned asymmetrically with respect to the longitudinal centre plane. In this connection it is envisaged that the base carrier—starting from a length dimension of the possible driving width(s) predetermined in standardised sizes—is connected to the at least one side support in a respective outer dividing third of this length dimension of the driving width. An asymmetric arrangement of the base carrier in relation to the longitudinal centre plane is thus defined as a functional basic construction.

A basic structure which surprisingly can be effectively used with regard to the prior art is predefined with this functional frame, which can be oriented substantially parallel to the ground and in top view can be executed in an E-, L- or U-shape. This allows for a surprising improvement in the diversity of use also with regard to the large number of designs of known gantry systems. The asymmetrical functional frame can be easily adapted to complex agricultural equipment applications. In this case only a small amount of conversion effort is required for use in the field and also for road travel. This basic structure of the functional frame can be optimally equipped, especially in cooperation with GPS-controlled automatic machine concepts and units as a user-specific basic carrier, and can then be used universally with virtually any arbitrary attachment devices. In this connection variable concepts of fully autonomous working machines can be implemented.

Starting from the hitherto customary designs of a "vertical accessible U-frame" in gantry systems of the prior art, with the asymmetric cross-support/side-support concept according to the invention a substantially improved scope of application for field and road uses is achieved by a compact and effectively stiffened overall concept in the region of the supporting and coupling parts. A road travel of the asymmetrical U-frame working machine with coupled-on units is now also possible. In this case simpler settings of the drive wheels and/or drive tracks can significantly simplify the operation. The asymmetrical functional frame has an improved stability in each application. In this case an optimised load distribution can be achieved with little effort by effective utilisation of a receiving space, defined according to the invention, between the supports.

In the position of use on farmland—in particular for varying attachment devices in farming, sowing, fertilising, spraying and harvesting, the asymmetrical functional frame can specify a plurality of attachment positions. In this case both a central receiving space between the side supports and a corresponding free space above and below the base carrier are used. This functional frame, which can thus be used in a multifunctional manner, also enables multiple attachment devices to be simultaneously received, so that variable processing sequences can be carried out more quickly.

An advantageous embodiment of the functional frame with an asymmetrical base carrier envisages that the driving width permissible in terms of traffic technology in the road orientation of the system is used as a reference variable. In this case, starting from an in particular maximum length dimension of the driving width, the base carrier can be placed so that the base carrier is connected to the at least one side support in a respective outer dividing third of this length dimension. In this connection it is envisaged that—starting from also variably pre-definable travel widths of the system—the base carrier on both side supports defines in each case mirror-image connecting regions for the respective ground supports with respect to a transverse mid-plane orthogonal to the longitudinal centre plane.

It is also envisaged that the base carrier extending substantially parallel to the direction of travel in the road orientation of the functional frame forms a connection position with the side supports, in which the asymmetrical base carrier with its outer edge region defines a lateral reference surface for the driving width to be maintained. The base carrier is thereby displaced—with respect to the longitudinal centre plane according to the invention—to an outer edge of the respective dividing third.

The structural conversion also envisages that the functional frame can form a support structure, substantially L-shaped in top view, with the at least one side support. Starting from this, it is envisaged that the functional frame can also be equipped on its base carrier with multiple subassemblies that can be used as side supports. The result is an advantageous embodiment of the overall system, in which a functional frame can be formed that is substantially E-shaped or U-shaped in top view.

The advantageously usable U-configuration is designed so that in each case only one of the side supports is attached to the two end regions of the base carrier. As a result, the two outer supports of this U-shape together with the base carrier define a central receiving space at least in some regions.

This concept with a frame structure stable in all use situations can in this connection be combined with variable lengths of the base carrier and variable length dimensions of the side support. A base surface of the receiving space, said base surface being at least surrounded in regions on two sides, can be defined such that, starting from this base surface, a usable receiving volume can be obtained and the central receiving space of the functional frame can thereby be configured to be largely variable. It is also conceivable that multiple receiving spaces of variable dimensions in terms of area and height are defined in the region of the functional frame. Depending on the specific application, the respective attachment devices are assigned to these receiving spaces in a positionally accurate manner.

Starting from this three-side support structure as the core of the system, it is envisaged that the functional frame in the region of the central receiving space can have at least three functional sections for coupling attachment devices in a respective plane on the supports. It is understood that in this case only individual sections of the functional sections can be used, or the system defines more than the three attachment zones serving for the coupling.

The further adaptation of the functional frame to the practical conditions envisages that the base carrier and/or the side supports can be designed to be adjustable in their horizontal position and/or their vertical height above a road surface or field working surface. In this connection it is also conceivable that the ground supports—in particular provided with supporting wheel—are adjustably connected to the functional frame.

Starting from the mirror-image construction of the floor-side supports with respect to the longitudinal central axis of the system, it is envisaged that in each case at least one ground support is provided on the respective side supports. These ground supports are provided with an advantageous pivoting construction, with which in addition to controlling the respective orientation, the conditions for the installation of attachment devices are also improved. In this connection it is envisaged that in at least one displaced operating position of the ground supports, an additional free space can be produced as access to the central receiving space open on one side.

The pivoting structure of the ground supports is for this purpose designed so that all components in the region of their retention on the functional frame can adopt a position outside the receiving space. In an expedient embodiment the construction envisages that two supporting wheels or belt drives interacting in pairs are provided on each of the side supports as the respectively displaceable ground support.

A further embodiment envisages that, in the region of the functional frame, at least one of the side supports can be connected to the base carrier such that it can be displaced in relation to the base carrier. In this connection an embodiment of the functional frame is also conceivable, which has a telescopic support structure in the region of the base carrier and/or at least one of the side supports. It is understood that respective drive units of the system provided as an internal combustion engine, hydraulic motor or electric motor, can be arranged optionally in the region of the base carrier and/or one of the side supports.

The multifunctional design of the stabilisable attachment system envisages that at least one of the attachment devices brought into the coupling position, can be brought into a structurally stiffening connection position on the functional frame. This structural-stiffening component combination envisages that with the respective use of the system i both in the working orientation and in the road orientation, an optimum load distribution on the functional frame can be achieved. In this way, in particular respective surface loads occurring in a traffic lane generated on the field can be distributed optimally. The optimal load distribution is also possible so that preferably the tilting tendency of the system can be minimised during road travel.

It has been found that, for a multifunctional use of the system, in addition to the base carrier used per se for coupling, the respective side supports can also define at least one attachment position for at least one of the agricultural attachment devices. In this connection the construction of the base carrier is designed in such a way that in its circumferential direction definable transverse to its longitudinal direction, said base carrier can also be provided on all sides with respective connecting regions for at least one of the variably usable attachment devices. In the region of the side supports it is envisaged that at least one of the attachment devices can be coupled to the respective inner and/or outer sides of the side supports.

An advantageous embodiment with regard to the stability and load distribution of the system is directed to the fact that the attachment devices can also have a connecting position associated on multiple sides with the respective support of the functional frame. As a result, the attachment devices can at least partially regionally enclose the respective carrier in its circumferential direction.

With the U-shaped design of the functional frame it is achieved that this can simultaneously accommodate multiple attachment devices, which are also aimed at different working effects, in the region of the base carrier and/or both side supports. In this case it is envisaged that in the region of the functional frame respective fixing elements are provided, which can be activated for a largely automatic attachment and removal of the attachment devices.

The drive concept for the working machine according to the invention envisages that also one or more motor-gear units with multiple drive connections can be integrated into the system. In this connection it is envisaged that the respective variably positionable attachment devices can be operated individually or jointly.

An advantageous application envisages that the system, which is supported in particular via belt drives on the ground side, can also be positioned with the asymmetrical functional frame in a compact road travel position by means of coupled attachment devices. In this case a chassis is defined with the functional frame, in which the belt drives can be aligned without any overhang in the region of at least one of the two lateral reference surfaces, and an optimally controllable road travel position is thereby achieved.

The structural conversion of the asymmetrical functional frame envisages that in the region of the E-, U- or L-structure, the side supports effective here can each have four crawler chains, four belt drives, four support wheels or a similar ground support arranged symmetrically in pairs. A comparatively simple and synchronously steerable system is thus formed.

In this connection it is envisaged that the functional frame can be used as an independently movable unit. This self-sufficient unit can execute respective positioning and coupling movements in order to connect or detach the at least one attachment device. An automatic control is also conceivable in this case. This can be directed to a construction with autonomous coupling of the components.

The respective attachment device can be fixedly placed in order to connect the components. Starting from this position the functional frame is then "moved up". In this connection driving, pushing, lifting and/or pivoting movements of the functional frame can be executed in such a way that the system components are connected or released. The self-sufficiently movable functional frame is designed so that agricultural implements can be attached largely in any arbitrary configuration in the region of respective connection points. The prerequisites for a fully autonomous use of the working machine according to the invention are thereby ensured.

The optimal implementation of the construction envisages that the asymmetrical base carrier of the system is equipped with at least one power supply unit in a compact construction. This energy supply unit provided on or in the base carrier is guided to the at least one attachment device, can be coupled to the drive unit, and at the same time is connected to at least one cooler/fan system. In this connection it is envisaged that the energy supply unit can activate the drive units provided here in the region of the side supports. The desired compact construction can thus be achieved.

An advantageous embodiment of the base carrier envisages that the base carrier is designed in the manner of a "hollow support". In this case the system is constructed in such a way that an interior space is defined that is surrounded at least in regions by contour plates and accommodates the essential functional parts of the system. An excess pressure can be generated in this interior by means of the cooler/fan system, so that protection against dirt and contamination is also achieved with effective heat regulation. It is understood of course that at least one drive train for the attachment devices and/or the drive wheels can be led out from this interior space.

The overall concept also envisages that the functional frame provided with at least one of the side supports can be designed as a modular unit. In this case it is envisaged that in particular a release of the side supports from the base carrier is possible in such a way that a compact dismantling for possible transportation can be achieved. It is also envisaged that respective modular segments are provided in the region of the contour plates, so that respective assembly openings can be released with little effort and in this way the stability of the system is maintained.

In the region of the ground supports provided on the side supports, the functional frame is provided in each case with at least one steering cylinder. Respective fixing positions for the caterpillars specifying the direction of the road or field can be controlled using this cylinder. In this case it is envisaged that mechanical latching elements define a stable position.

The driving caterpillars preferably provided as ground support define within their movement path an inner support space, in which the drive components can be effectively placed. It is envisaged that in particular an E-motor with a planetary gear is arranged in the inner support space. This assembly is arranged in such a way that an installation position free of lateral overhang and running below the width of the caterpillar track is achieved, and damage can thus be effectively prevented.

For an effective force application in the region of the caterpillar tracks, it is envisaged that the ground supports have a lifting cylinder engaging in a vertical hollow shaft as a supporting steering shaft. Heavy weight loads can also be effectively absorbed by this support connection.

For a largely automatic coupling of attachment devices the base carrier is provided with respective twist-lock connectors, so that standard components can be effectively used. In the region of the optionally provided driver's cab of the system, it is envisaged that different positions of use of the driver's cab can be specified by means of a pivoting support connection.

The invention thus relates in particular preferably to the or to a self-propelled working machine for agriculture, with a support structure accommodating respective attachment devices, and comprising at least one drive unit with a control assembly and movable by means of end-side ground supports, which forms an agricultural gantry system provided with at least one base carrier for variable work tasks, which starting from a road orientation defining a travel width can be converted into a working orientation having a greater or substantially greater working width, wherein the support structure is provided with respective side supports comprising the ground supports. The self-propelled machine is further developed in particular in that the support structure defining a longitudinal orientation in the direction of the road has, in the region of its two end-side ground supports, a vertical longitudinal centre plane extending between these, and in a spatial orientation thereto a functional frame with an asymmetrical base carrier is formed as a support structure, in particular in such a way that, starting from the length dimension of possible driving width(s), the base carrier is connected to the at least one side support in a respective outer dividing third of this length dimension. The gantry system is for example also referred to as a portal system or as a gantry system or bridge system.

The self-propelled machine is preferably further developed in such a way that, in the road orientation of the functional frame, its asymmetrical base carrier running parallel or substantially parallel to the direction of travel defines a lateral boundary surface for a maximum permissible driving width to be observed.

The support structure with the asymmetrical base carrier advantageously forms at least one central receiving space.

The functional frame preferably has an L-shaped or substantially L-shaped support structure in top view with only one of the side supports.

The functional frame is preferably provided on its base carrier with multiple subassemblies usable as side supports, in particular in such a way that a functional frame that is E-shaped or U-shaped or substantially E-shaped or U-shaped in top view is formed.

The self-propelled machine is advantageously developed in such a way that in each case only one of the side supports is provided at both end regions of the base carrier, and thus in particular a receiving space bounded by three supports at least in regions can be defined or is defined.

The self-propelled machine is preferably further developed in such a way that with variable lengths of the base carrier and variable length dimensions of the side support or supports, a base surface that is enclosed at least in regions on two sides will be or is defined, and with this in particular the volume of at least the central receiving space of the functional frame is or can be variably arranged.

Preferably multiple receiving spaces which are to be variably dimensioned in terms of height are provided in the region of the functional frame.

The functional frame advantageously has at least in the region of the central receiving space at least three functional sections for coupling attachment devices in a plane, in particular in such a way that in each case at least one mounting position for at least one of the agricultural attachment devices can be predefined or is predefined by the base carrier and/or the respective side supports.

The self-propelled machine is preferably developed in such a way that the base carrier and/or the side supports are adjustable or are adjusted in their horizontal position and/or their vertical height above a road or field working surface.

Preferably the ground supports provided in particular with support wheels and/or belt drives and/or similar are adjustably connected to the functional frame.

The self-propelled machine is advantageously developed in such a way that in each case at least one ground support is provided on the respective side supports and these are provided in particular with a respective pivoting structure, preferably in such a way that in at least one operating position of the ground support(s) an additional free space can be created or is created as access at least to the central receiving space.

Preferably two support wheels and/or belt drives cooperating in pairs are provided on each of the side supports as the respectively displaceable ground support.

Preferably in the region of the functional frame at least one of the side supports is connected to the base carrier in such a way that it can be displaced in relation to said base carrier.

The self-propelled machine is advantageously developed in such a way that the functional frame is telescopically designed in the region of the base carrier and/or at least one of the side supports.

Preferably, the drive unit of the system comprising an internal combustion engine and/or actuated electrically or hydraulically, is arranged optionally in the region of the base carrier and/or one of the side supports.

The at least one attachment device preferably defines a structurally stiffening connecting point on the functional frame, in particular in such a way that with respective use of the system both in the working orientation and in the road orientation, an optimal load distribution on the functional frame can be achieved or is achieved.

Advantageously, the base carrier and/or the side supports are provided on all sides with respective connecting regions for at least one of the variably usable attachment devices, in a circumferential direction that can be defined transversely to the side supports or to their longitudinal direction.

Preferably the attachment device device(s) has or have a connection point associated on multiple sides with the respective support of the functional frame, in particular in such a way that the attachment device(s) at least encloses or enclose in regions the respective support in its circumferential direction.

Preferably, in the region of the base carrier and/or the two side supports multiple attachment devices can be fixed at the same time, in particular also directed to different work operations.

Advantageously, in the region of the functional frame respective activatable fixing elements can be provided for an in particular largely automatic attachment and removal of the attachment devices.

The self-propelled machine is preferably developed in such a way that the system comprising one or more drive units is provided with multiple drive connections and thus in particular the respective variably positionable attachment devices can be operated individually or jointly.

The self-propelled machine is preferably further developed in such a way that the system, supported on the ground side in particular by belt drives, can be positioned on the asymmetrical functional frame with coupled attachment device(s) in a compact road travel position, and in this case in particular the belt drives in the region of at least one of the two lateral reference surfaces (9) can be aligned free of overhang.

The self-propelled machine is advantageously developed in such a way that the asymmetrical functional frame has in each case four crawler tracks, four belt drives, four support wheels or similar ground supports arranged symmetrically in pairs on the side supports forming the U-structure or L-structure, whereby in particular a synchronously steerable system is formed.

The functional frame preferably forms an independently movable unit.

Preferably, in order to connect or release the at least one attachment device, respective controllable positioning and/or coupling movements can be executed by the functional frame.

The self-propelled machine is advantageously developed in such a way that the at least one attachment device is placed in an immovably or largely immovably manner, and the system components can be coupled or decoupled in this position in particular by means of respective driving, pushing, lifting and/or pivoting movements of the functional frame.

Preferably, the functional frame in the region of its respective connection points can be or is connected to agricultural implement types of any arbitrary or largely arbitrary configuration.

The self-propelled machine is preferably further developed in such a way that in the road orientation of the functional frame, its asymmetrical base carrier running substantially parallel to the direction of travel is provided with at least one power supply unit, and this can be coupled in particular to at least one drive unit guided or guidable to the attachment device, coupled or connectable to the drive system, and activating at least one cooler/fan system in the region of the side supports Advantageously, the base carrier defines an interior space surrounded at least in regions by contour plates and accommodating functional parts of the system, wherein on the one hand an excess pressure can be generated in the interior space by means of the cooler/fan system, and on the other hand at least one drive train for attachment devices can be out or is guided out.

The functional frame provided with at least one of the side supports is preferably designed as a modular unit, preferably in such a way that a mounting opening can be freed in particular in the region of the contour plates, and the side supports can be detached from the base carrier.

The self-propelled machine is preferably further developed in such a way that the functional frame in the region of the ground supports provided on the side supports is provided in each case with at least one steering cylinder, by means of which in particular respective fixing positions of the driving tracks specifying the road or field driving direction can be controlled.

Advantageously, the driving caterpillars provided as ground supports have in an inner supporting space enclosed by the movement path of the caterpillars, an electric motor with planetary gearing, wherein this assembly runs in particular without overhang underneath the width of the driving caterpillars.

The ground supports preferably have a lifting cylinder engaging in a vertical hollow shaft as a steering shaft.

Preferably the base carrier is designed in the region of respective twist-lock connectors for a mainly automatic coupling of attachment devices.

Advantageously the driver's cab can be pivoted and/or raised in the region of its support connection.

BRIEF DESCRIPTION OF THE DRAWINGS

Further details of the machine according to the invention can be seen from the following description. To this end the accompanying drawings serve for explanation. The drawings show:

FIG. 17 is a schematic illustration of the system with assemblies integrated into the base carrier;

DETAILED DESCRIPTION OF THE INVENTION

Figure 1:
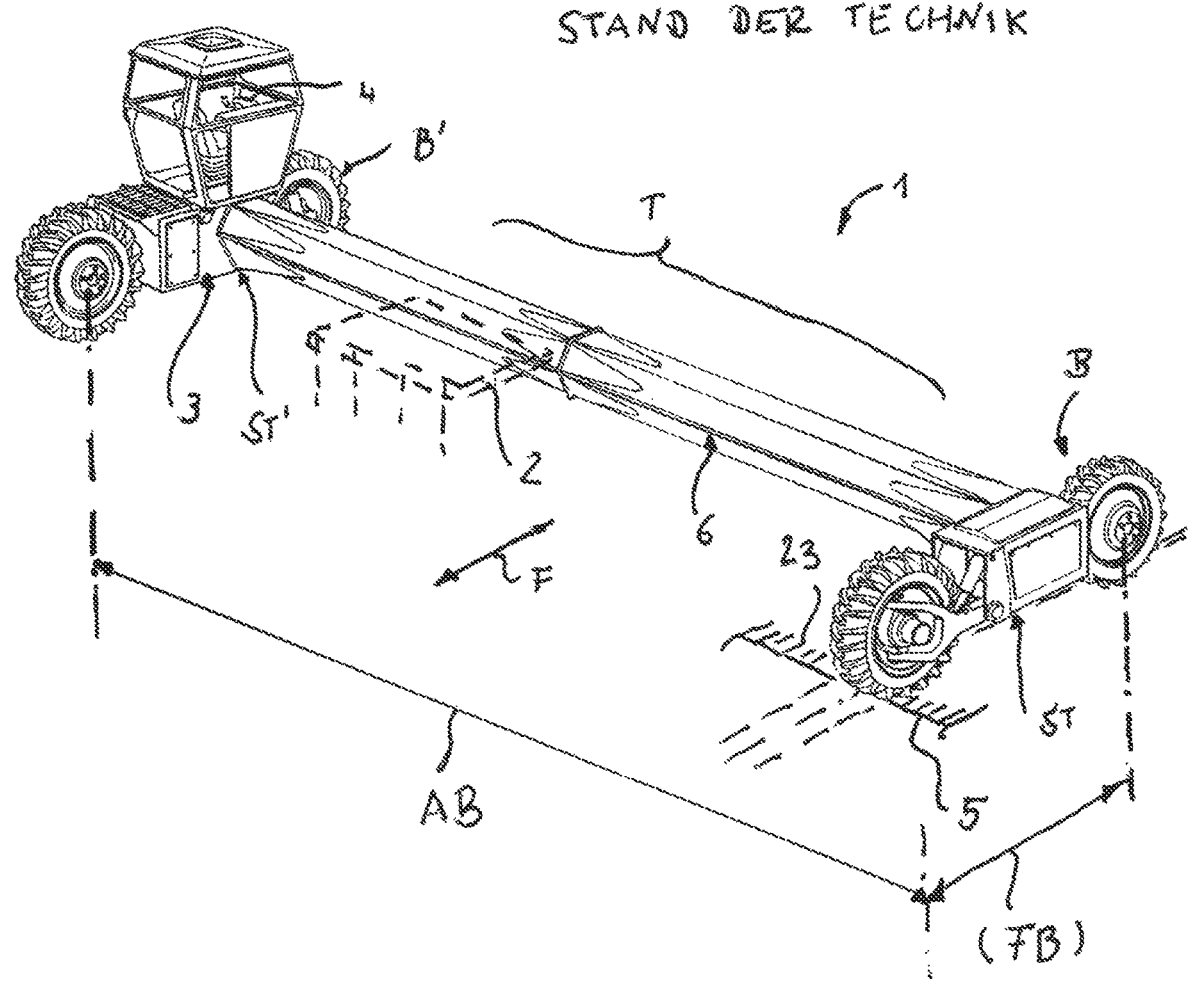
FIG. 1 is a perspective view of a support structure for an agricultural working machine, which forms the basis of a gantry system according to the prior art.

A basic principle of a self-propelled agricultural working machine is shown in FIG. 1 as the prior art. This working machine 1 forming an agricultural gantry system has a support structure T, which in turn can receive respective attachment devices 2, has at least one drive unit 3 with control assembly 4, and can be moved on the ground 5 by means of end-side ground supports B, B'. This support structure T forms with at least one base carrier 6 as a substantially centrally extending assembly, the agricultural gantry system, which can be adapted to varying working tasks in the region of the attachment device 2. Starting from the working orientation of the system illustrated in FIG. 1 (optionally direction of travel F) with a working width AB, such gantry systems can be converted into a road orientation (direction of travel FS) defining a driving width FB (similar to FIG. 4). For this purpose the support structure T uses the side supports ST, ST' provided on the central base carrier 6 together with the ground supports B, B'.

Figure 4:
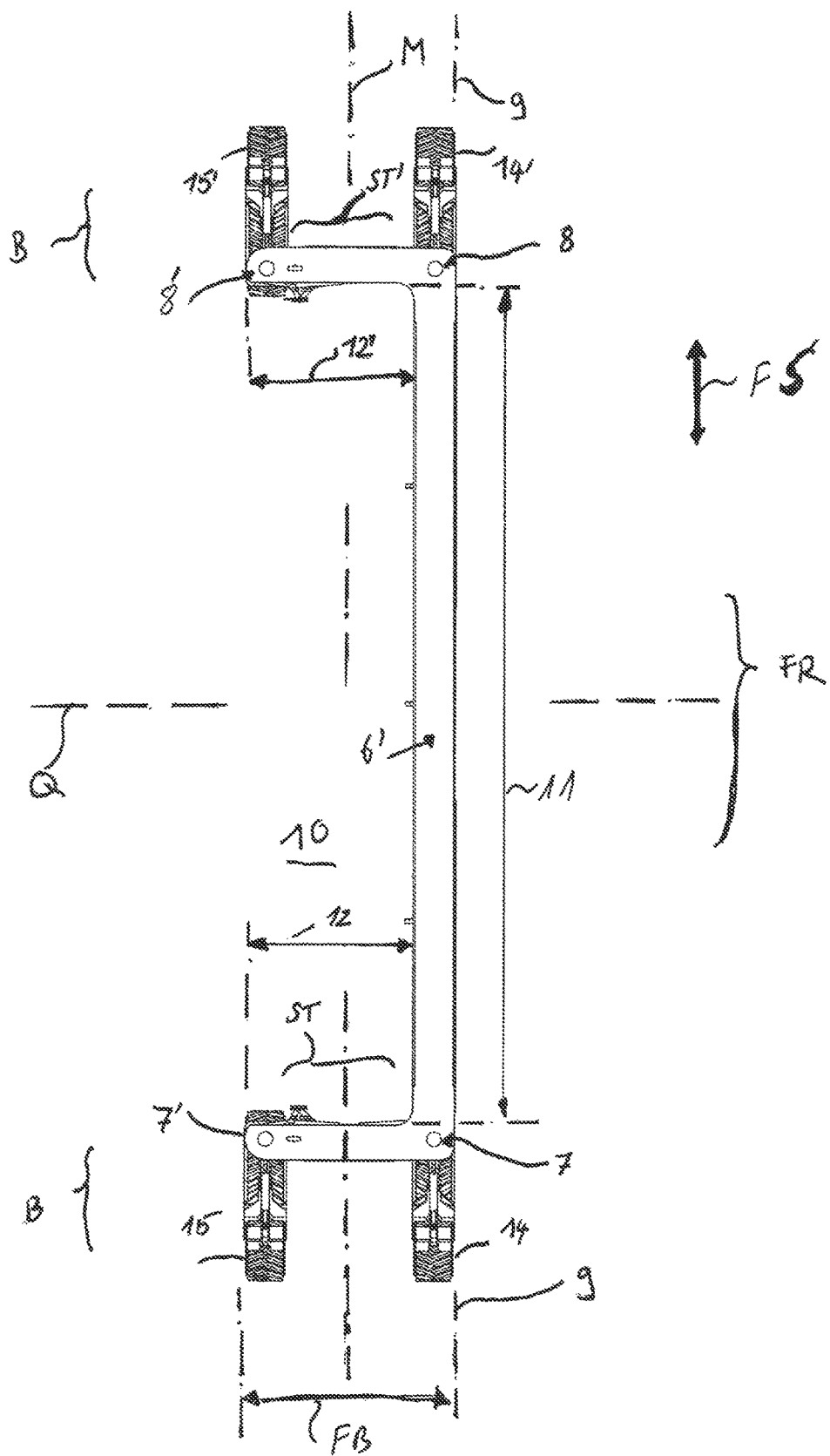
FIG. 4 is a top view of the functional frame in road orientation.
Figure 5:
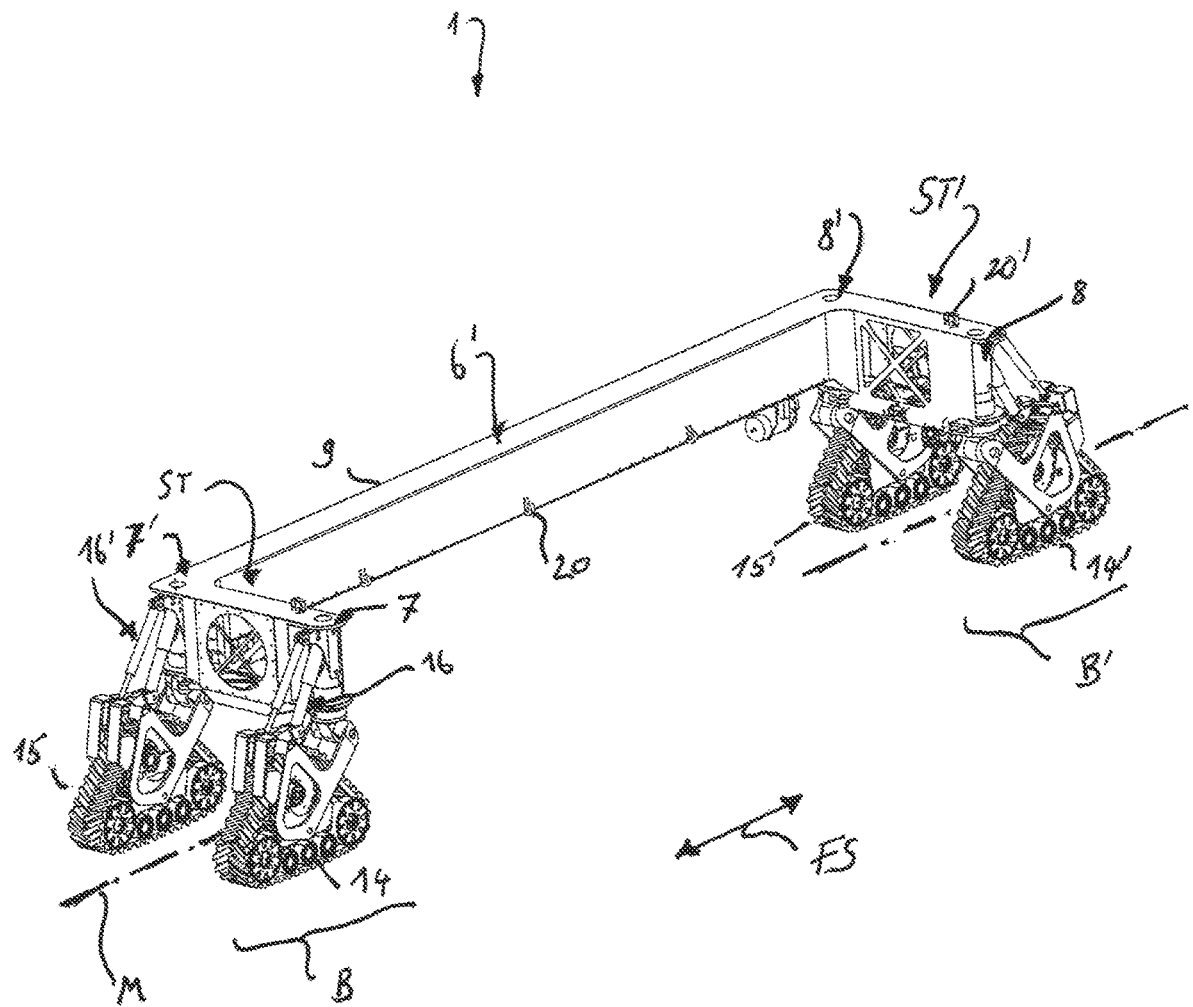
FIG. 5 is a perspective view of the functional frame according to FIG. 4.

The self-propelled working machine 1 is based according to the invention on a combination of components, by means of with which the known support structures T of agricultural gantry systems are improved. It is now envisaged that in the road orientation with direction of travel FS of the machine 1, the ground supports B, B' arranged at the end on the base carrier 6' define a vertical longitudinal centre plane M extending between them (FIG. 4). According to the invention, in relation to this functional longitudinal centre plane M for the road orientation, the support structure is designed as a functional frame FR with asymmetrical base carrier 6'.

Figure 6:
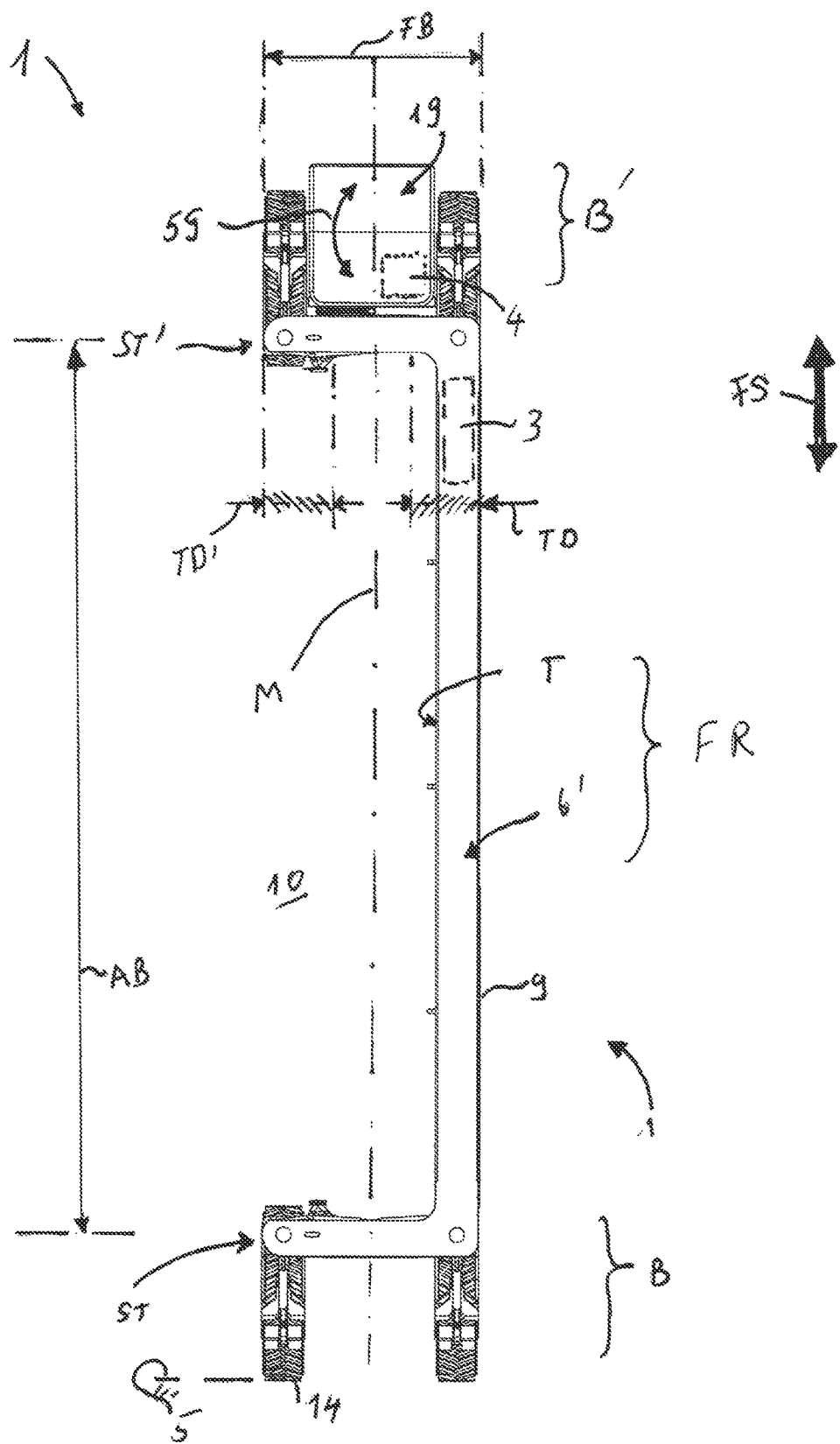
FIG. 6 is a top view of the functional frame similar to FIG. 4 with a control cabin.
Figure 7:
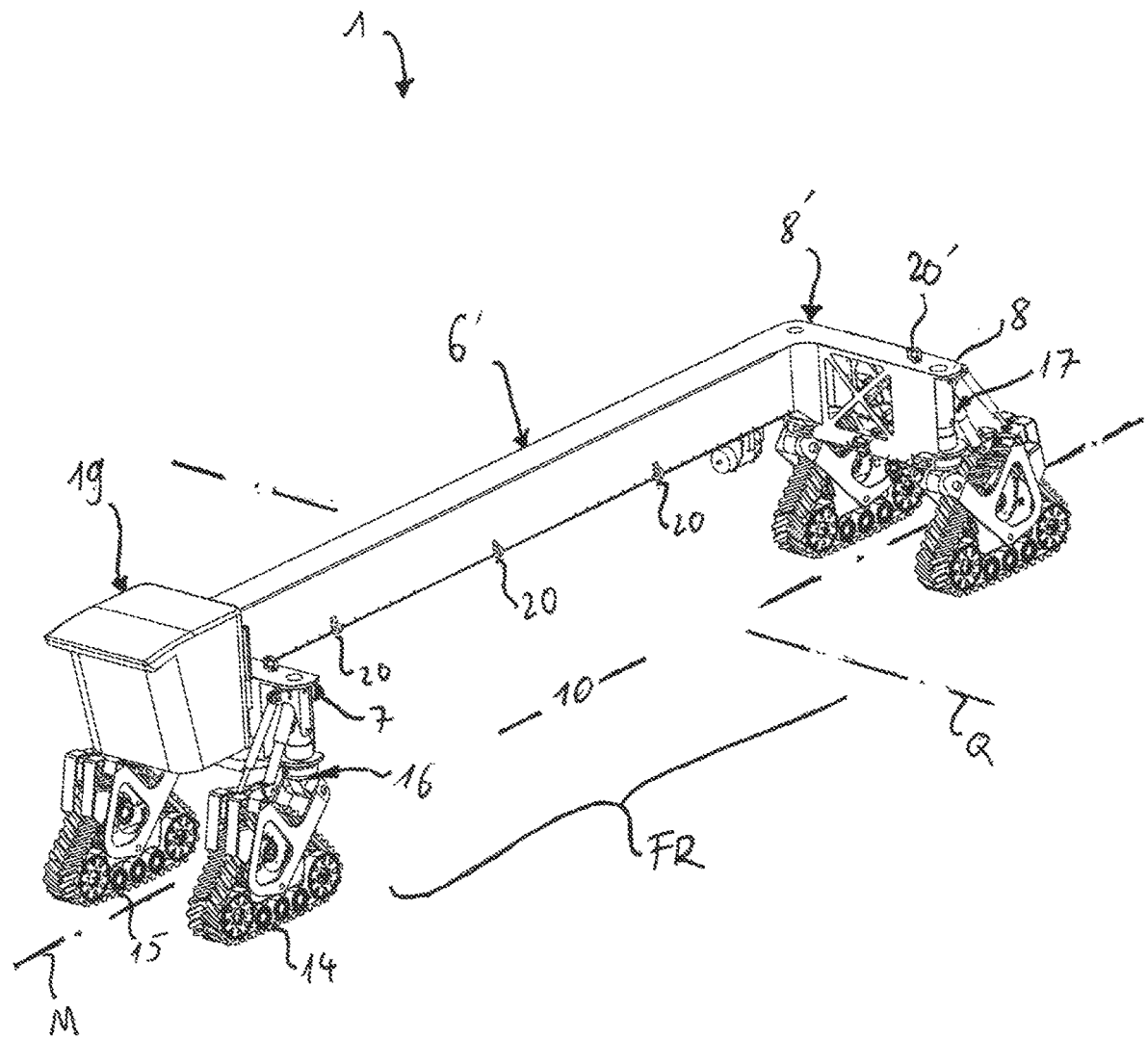
FIG. 7 is a perspective view of the system of FIG. 6.

This is followed by a multiplicity of structurally possible designs, in which starting from an also variable dimension of the possible driving width(s) FB, it is possible to optimise the position of the base carrier 6' with a view to the stability of the component-composite system. It has been shown that the base carrier 6' can be connected to the at least one side support ST, ST' in particular in a respective outer dividing third TD, TD' (FIG. 6, top) of this length dimension FB.

Figure 2:
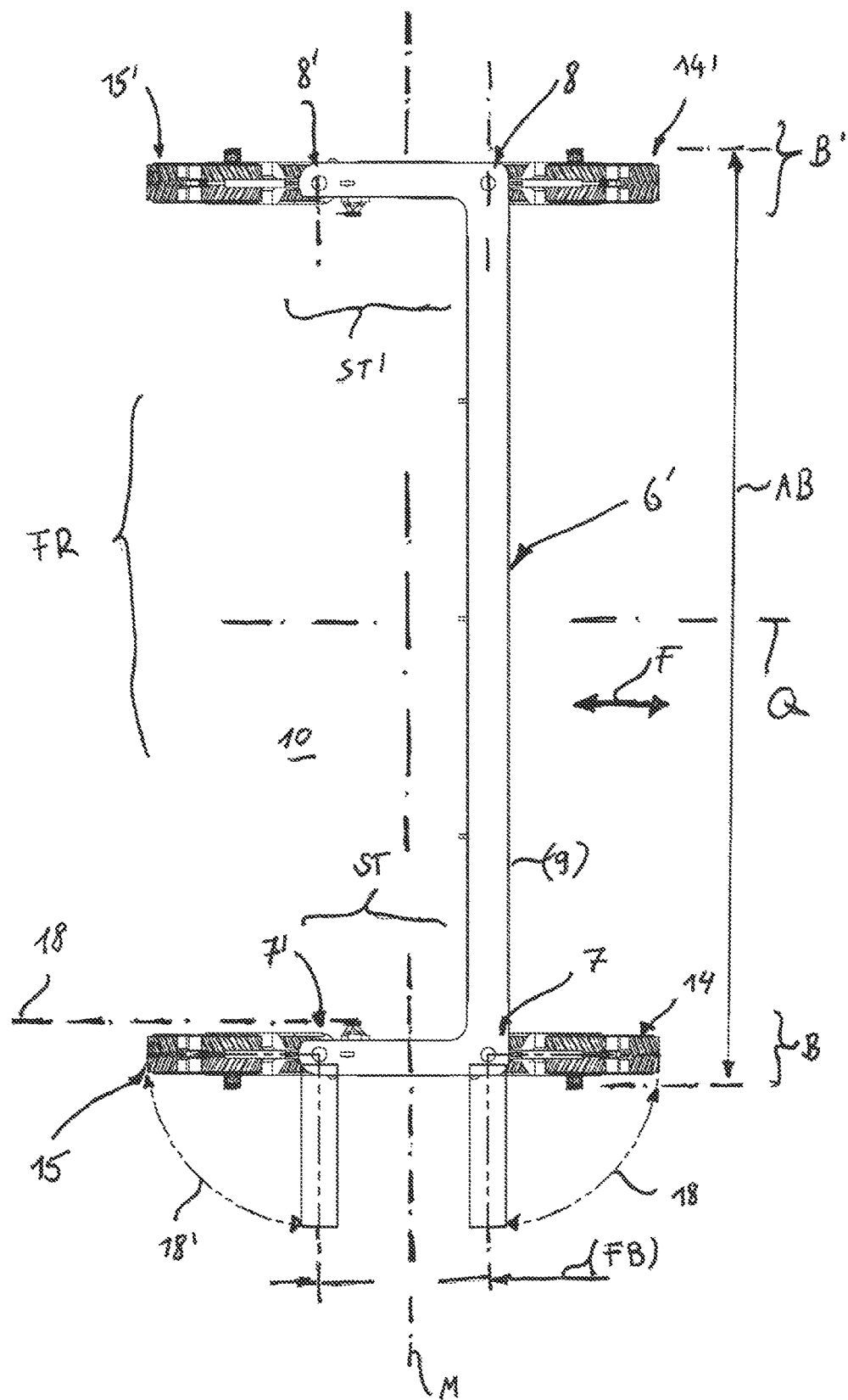
FIG. 2 is a top view of a system according to the invention with a functional frame having an asymmetrical base carrier.
Figure 3:
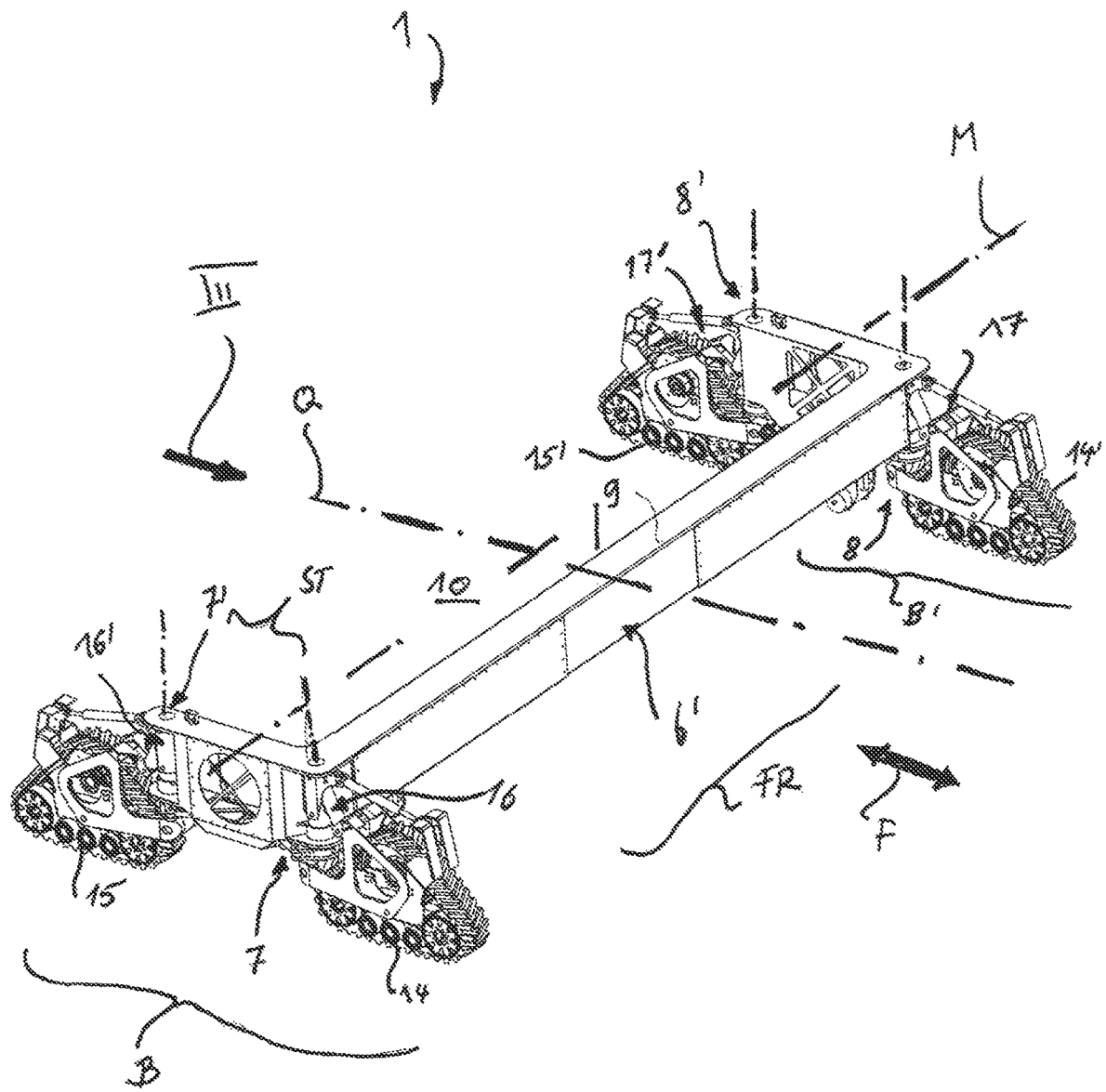
FIG. 3 is a perspective view similar to FIG. 2 with the functional frame according to the invention in working alignment.

From an overview of the illustrations according to FIGS. 2 to 7, it becomes clear that—starting from variably predefinable travel widths (length dimension FB) of this asymmetrical system—the base carrier 6' on the at least one side support ST, ST' defines respective connecting regions 7, 7'; 8, 8' for the ground supports B, B', which are arranged largely as mirror images relative to the transverse centre plane Q according to the working orientation (FIG. 2, FIG. 3)

Starting from the concept of the asymmetrical function frame FR according to the invention, this provides the possibility that its base carrier 6' running substantially parallel to the direction of travel FS or longitudinal centre plane M, can form a continuous lateral reference surface 9 (FIG. 4). This is then used as a starting plane for a maximum permissible driving width that has to be maintained, according to the length dimension FB.

Figure 12:
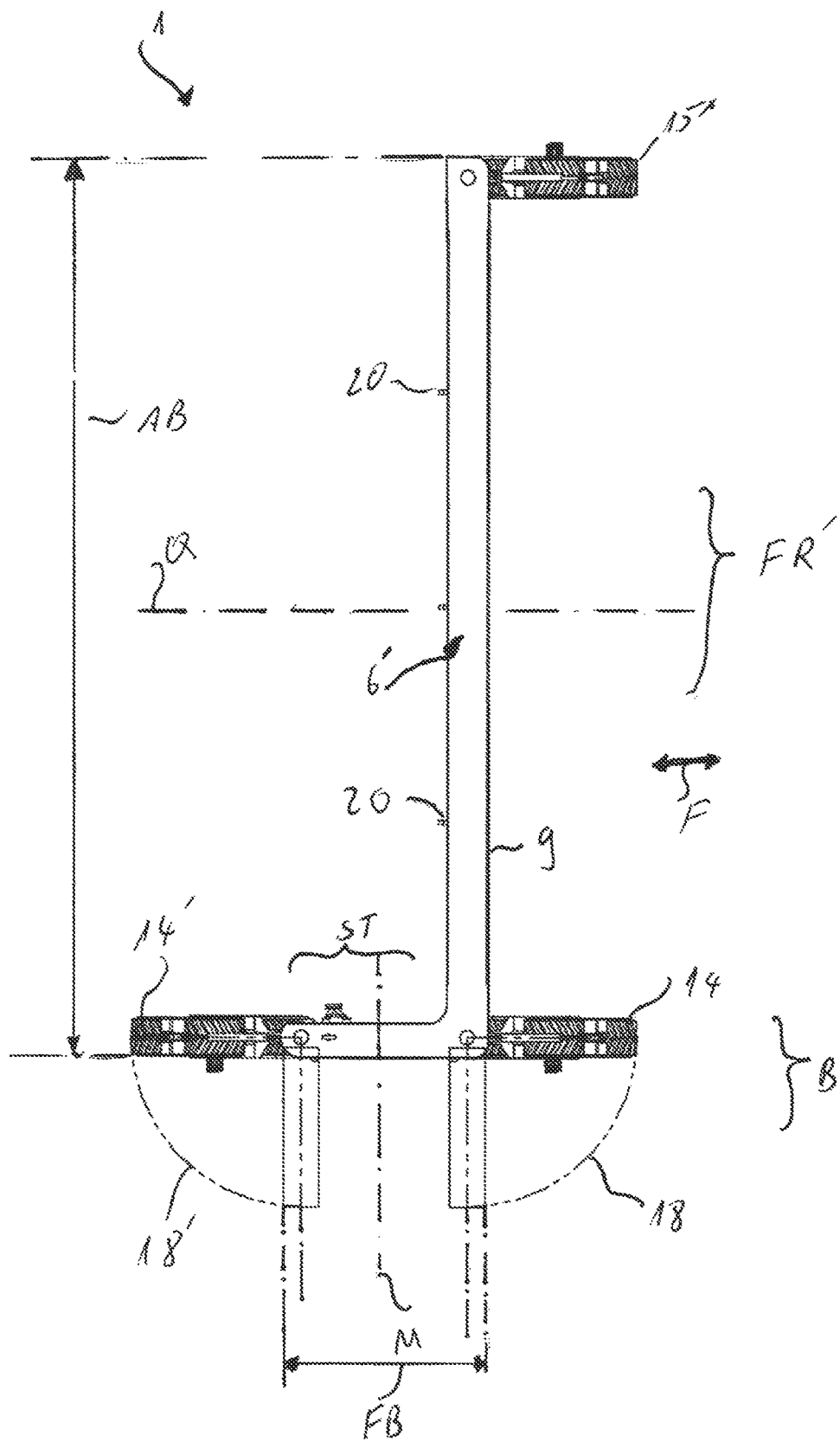
FIG. 12 is a top view similar to FIG. 2 with an L-shaped functional frame.
Figure 13:
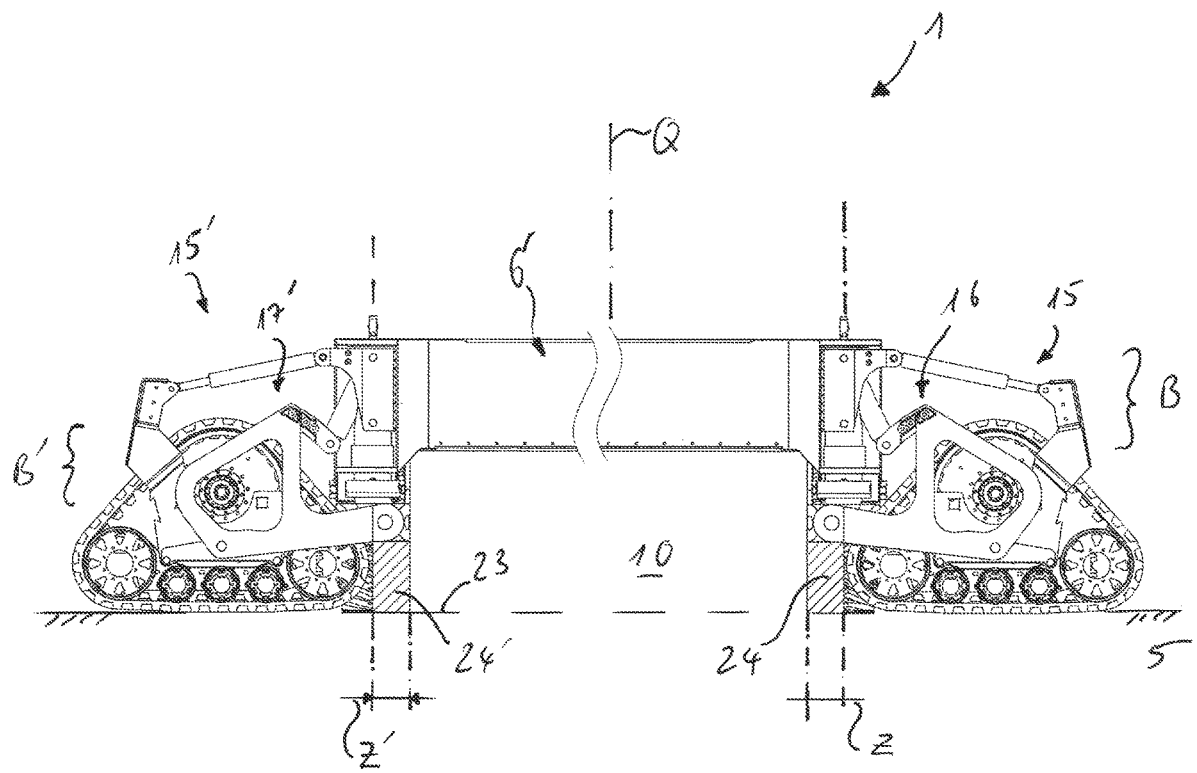
FIG. 13 is a view of the functional frame in the working orientation with the viewing direction according to arrow III in FIG. 3.

In this connection a design of the frame construction is conceivable in which the functional frame FR' has a support structure substantially L-shaped in top view, with only one of the side supports ST, ST' (FIG. 12). This construction is largely equivalent to the further illustrated frame variants, so that the individual components are designed accordingly.

An optimum combination of the support assemblies envisages that the functional frame FR is provided on its base carrier 6 with multiple components that can be used as respective side supports ST, ST'. This produces for practical use a construction in which a functional frame FR (FIGS. 2 to 11; FIGS. 13 to 16), which is essentially U-shaped in top view, is used. An E- or F-shaped construction (not shown) is also conceivable.

For the preferred embodiment of the U-frame, in each case only one of the side supports ST, ST' is provided at the two end regions of the base carrier 6. This three-support concept is aimed at providing a central receiving space 10, which is delimited in regions and thus forms an inventive base element. Thus, with variable lengths 11 of the base carrier 6 and variable length dimensions 12, 12' of the side supports ST, ST', a three-sided base surface of the functional frame FR can be defined in the region of the "inner" receiving space 10 (FIG. 4). This then provides for the practical application of the component combination, wherein with this variably adjustable base area of dimensions 11 and 12 the usable receiving volume—corresponding to the height 13 (FIG. 8)—in the region of the central receiving space 10 also allows a multiplicity of variable uses (FIGS. 8 to 16), and in this way tilling, sowing, fertilising, spraying and harvesting plans can be executed in an optimum manner.

The modular overall system in the region of the functional frame FR is also directed to the fact that in the region of the functional frame FR multiple receiving spaces 10, 10' to be variably dimensioned in the height dimension 13 (FIG. 9) can be defined in the region of the functional frame FR.

Figure 8:
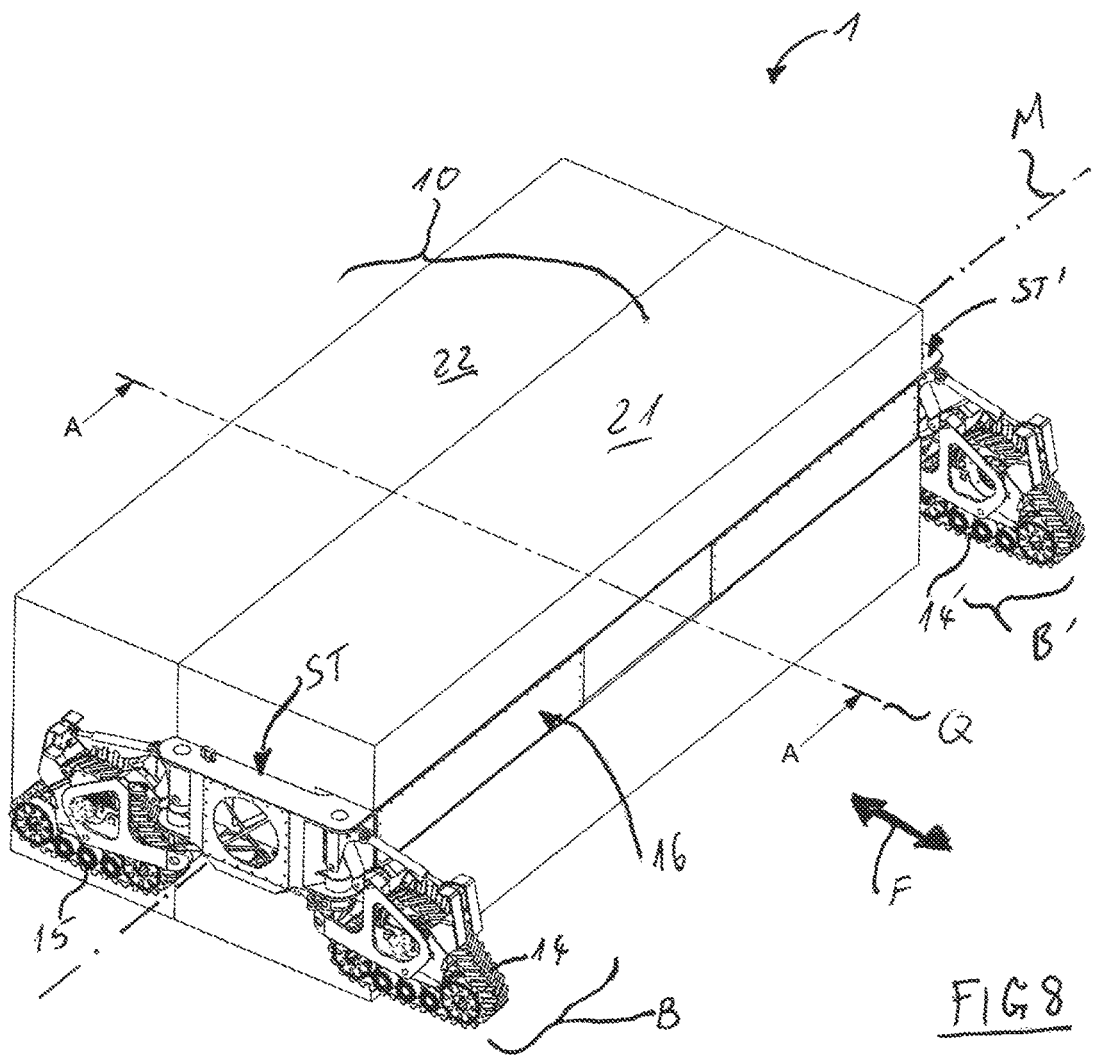
FIG. 8 is a perspective view of the functional frame similar to FIG. 3. showing a schematic representation of the installation position of attachment devices.
Figure 9:
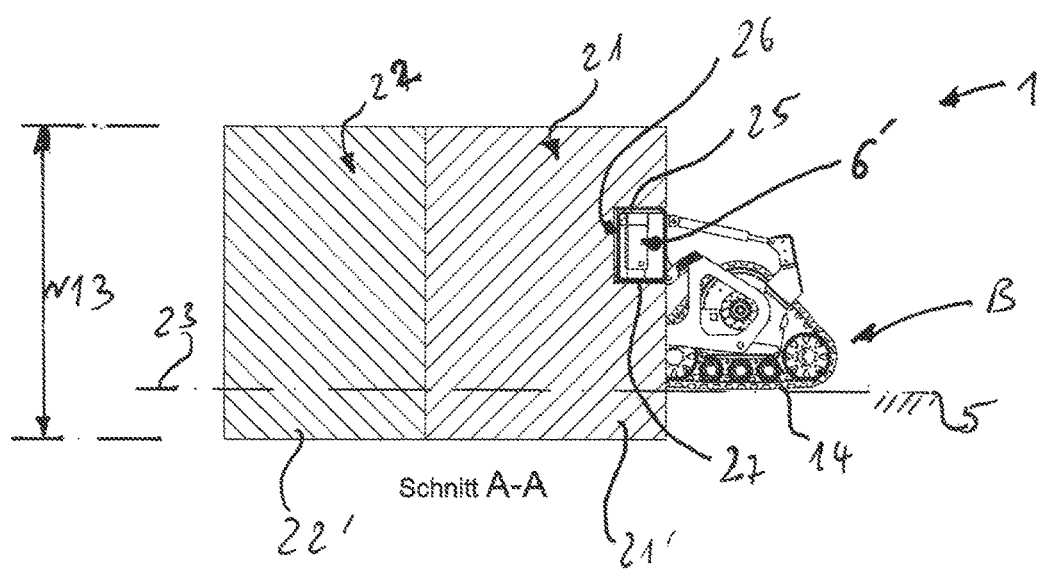
FIG. 9 is a sectional view according to arrow A-A in FIG. 8.
Figure 10:
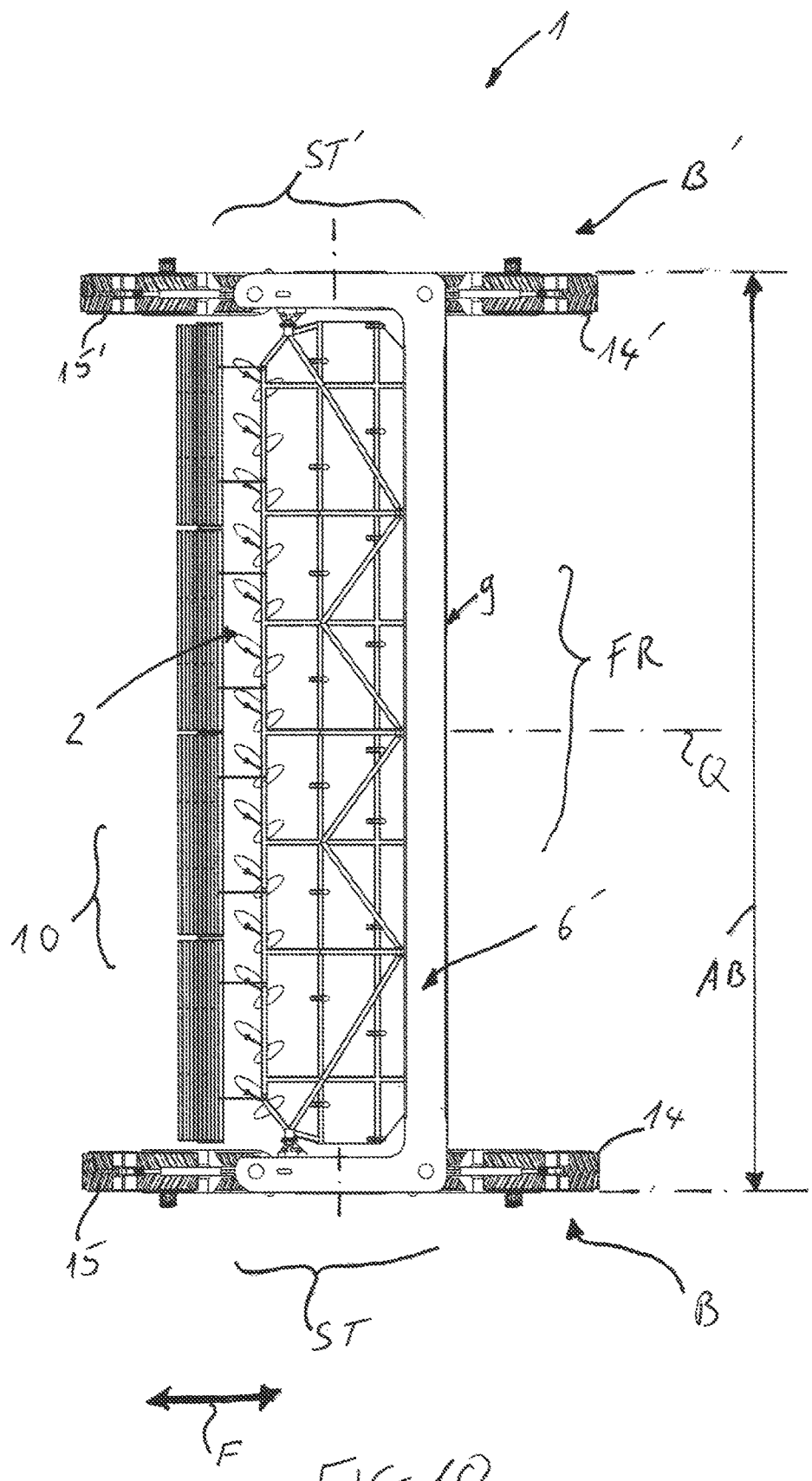
FIG. 10 is a top view of the functional frame similar to FIG. 2 with an attachment device integrated into a central receiving space.
Figure 11:
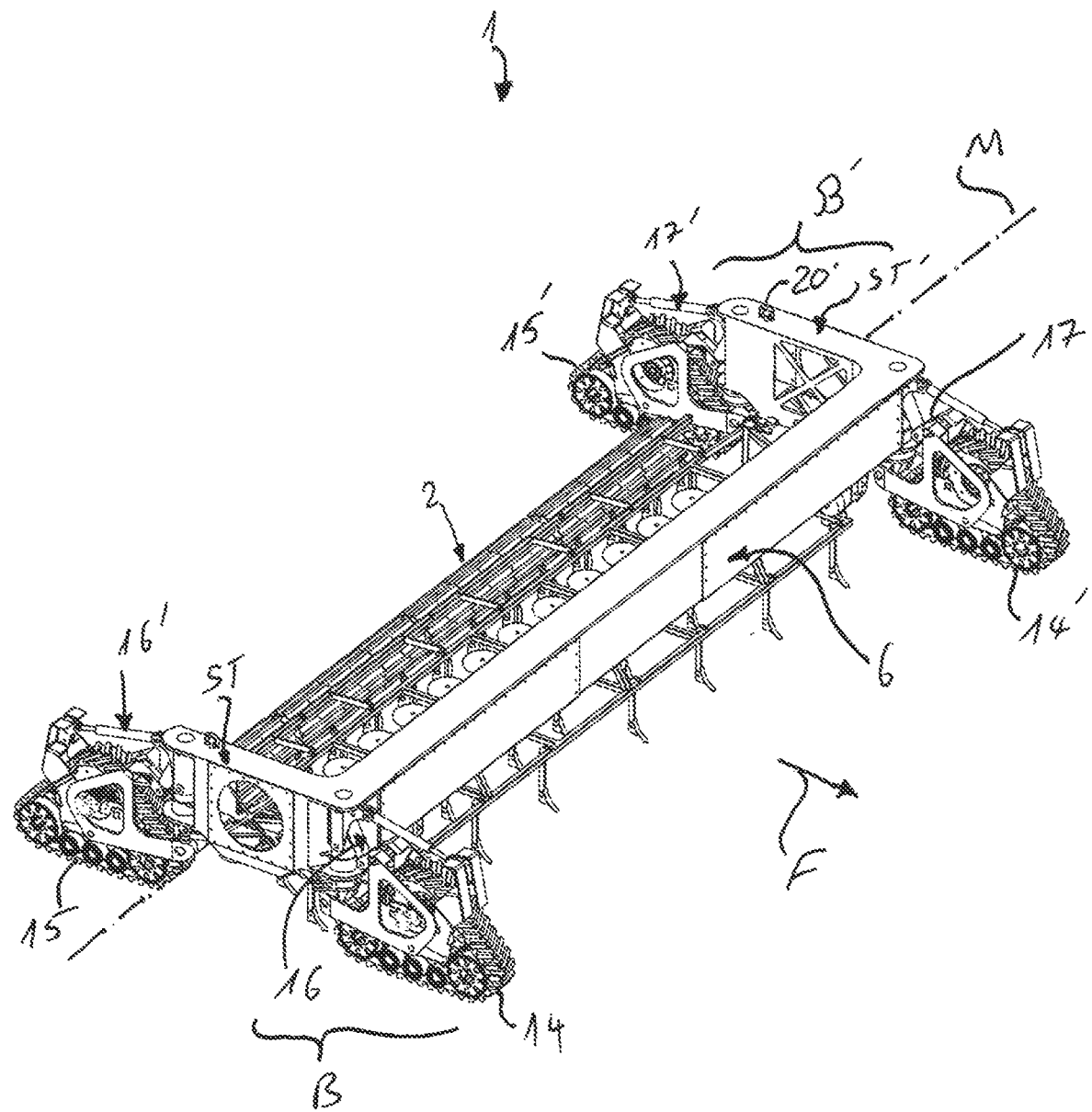
FIG. 11 is a perspective view of the self-propelled working machine positioned in the working orientation.

It is clear in this connection that the "three-sided" functional frame FR with the asymmetrical base carrier 6 and the side supports ST, ST' comprises several—in particular at least three—functional sections for the coupling and decoupling of attachment devices 2' (FIG. 10) at least in the inner region of the central receiving space 10. In this case the attachment devices 2' can preferably occupy respective spatial regions 21, 22 (FIG. 8, cuboid structure; FIG. 9, hatched cross sections of the receiving space), in which a stable support is ensured. The working of the agricultural area in the region of the ground 5 is indicated by respective spatial regions 21' and 22'.

Further structural improvements of the functional frame FR are directed to the fact that the base carrier 6 and/or the side supports ST, ST' in their respective horizontal position—i.e. in the direction of the longitudinal centre plane M or the transverse plane Q—and/or their vertical height 13 above a road surface or field working surface 5 (FIG. 9) can be adjusted largely arbitrarily. In this connection it is also conceivable that the ground supports B, B' provided in particular with support wheels, belt drives or similar are, for their part, adjustably connected to the functional frame FR.

From the illustration in FIG. 2 (similar to FIG. 12), in the region of the ground support B—with the connecting regions 7, 7'—the possibility of adjustment conceivable for the displacement from the working orientation (working width AB) to the road orientation (driving width FB) is illustrated in principle. In this case respective belt drives 14, 15, 14', 15' (in the case of ST') are provided on the side carrier ST, which are held by a special pivoting structure 16, 16; 17, 17' (FIG. 3). This pivoting construction 16, 16; 17, 17' enables the pivoting movements, partially indicated by an arrow 18, 18'. In conjunction with the principle according to FIG. 2 with the "pivoted-up" front view according to FIG. 13, it is clear that in at least one operating position of the ground supports B, B' an additional lateral free space 24, 24' (width Z, Z') can be produced as access to the at least central receiving space 10. The coupling and decoupling of the attachment devices 2 (FIG. 10) is thus possible without hindrance by means of the components of the ground supports B, B'. The optimal design of these components displaceable in the "release position" envisages that two supporting wheels or belt drives 14, 15, 14', 15' cooperating in pairs are provided on each of the side supports ST, ST' as the respectively displaceable ground support B, B'.

Further improvements of the asymmetric three-support system can be achieved if, in the region of the functional frame FR, at least one of the side supports ST, ST' is connected to the base carrier 6' so it can be displaced in relation to the base carrier 6'. It is also conceivable that the functional frame FR can be formed with telescopic components (not illustrated) in the region of the base carrier 6' and/or at least one of the side supports ST, ST'.

In order to complete the self-propelled working machine 1, corresponding drive and control assemblies are provided. In this connection a system operable from a driver's cab 19 (FIG. 6, FIG. 7) can be provided with a drive construction formed as a motor-gear unit, not shown in detail. This can be implemented as an internal combustion engine, an electric motor, a hydraulic motor or similar. The drive construction can for its part be arranged in the region of the base carrier 6 and/or one of the side supports ST, ST' (not shown in detail). It is also conceivable to use assemblies known from the prior art for a largely automatic control—for example a GPS-guided system—for the machine 1. The overall concept of the working machine 1 is designed in such a way that a fully autonomous operation and use is also possible.

The basic construction of the functional frame FR according to the invention is designed for the modular construction and a stable implementation for each specific application in such a way that also complex structures of attachment devices, for example complete harvesting equipment such as cutters, combine harvesters or similar multifunctional units with corresponding accessories, can be accommodated with the base carrier/side support unit. It is advantageously envisaged that the at least one attachment device 2 on the functional frame FR can define a structure-stiffening connection position. This stabilisation concept is aimed at the fact that when the system is used both in the working orientation and in the road orientation, in each case an optimal load distribution on the functional frame FR is achieved. In addition to a safe handling of the machine 1 also equipped with the components, the working life of the machine 1 can also be ensured.

In this connection the functional frame FR is constructed in such a way that the base carrier 6 and/or the respective side supports ST, ST' can in each case specify at least one defined mounting position for at least one of the agricultural attachment devices 2. Starting from the basic representations in FIG. 8 and FIG. 9 it is clear that the base carrier 6', in its circumferential direction definable transversely to its longitudinal orientation, can also be provided on all sides with respective connecting regions for at least one of the variably usable attachment devices 2. In FIG. 8 and FIG. 9 the base carrier 6' is included on three sides 25, 26, 27. It is also conceivable that the at least one attachment device 2 can be attached to respective inner and/or outer sides of the respective side support ST, ST'; in FIG. 8 the receiving space 10 is shown adjoining the side supports ST, ST' on the inside.

From the sectional view in FIG. 9 it is clear that the attachment devices 2 (only schematically indicated) here filling the receiving space 10 are assigned to the respective base carrier 6 of the functional frame FR on multiple sides, so that the attachment devices 2 at least enclose the base carrier 6 in regions in its circumferential direction (FIG. 9, right-hand side). A similar concept is also conceivable in the region of the side supports ST, ST' (not shown).

The optimal design of the functional frame FR with a view to a largely arbitrary modular extension envisages that, in the region of the base carrier 6' and/or both side supports ST, ST', multiple attachment devices 2 intended for different working effects can also be fixed at the same time. Starting from work steps involving soil working (basic representation according to FIG. 11), further agricultural work steps with a view to the sowing of seeds, subsequent fertilisation, intermediate pest control and the final harvesting operation can be carried out using the working machine 1. For all tasks, respective fixing elements 20, 20' (FIG. 5, FIG. 6) for the special attachment devices 2 are provided in the region of the functional frame FR. In this case constructions with actuating assemblies are conceivable, in which a largely automatic attachment and/or detachment of the attachment devices 2 can also be activated. It is also conceivable that one or more drive motors are integrated into the system as respective units, so that multiple drive connections can also be used. With this embodiment the operation of the respective variably positionable attachment devices 2 can then be executed individually or jointly.

With the three-leg design of the functional frame FR according to the invention, it is achieved that the functional frame FR supported on the floor side, in particular with four belt drives, can in the region of its "asymmetrical receiving system" also be positioned in a compact road travel position with attachment devices 2 located in the coupling position. From the illustrations in FIG. 4 to FIG. 7 it is clear in this case that the belt drives 14, 15, 14', 15' can be aligned without overhang in at least one of the two lateral reference surfaces 9, and the safety in the road orientation is thereby ensured.

The advantageous embodiment of the system envisages that the asymmetrical function frame FR on the side supports ST, ST optionally forming the E-, F-, L or U-structure can in each case have four crawler chains, four belt drives, four support wheels or similar or ground supports B, B' in a paired symmetrical arrangement, and a synchronously steerable implementation of the system is thereby formed.

Figures 14, 15, 16:
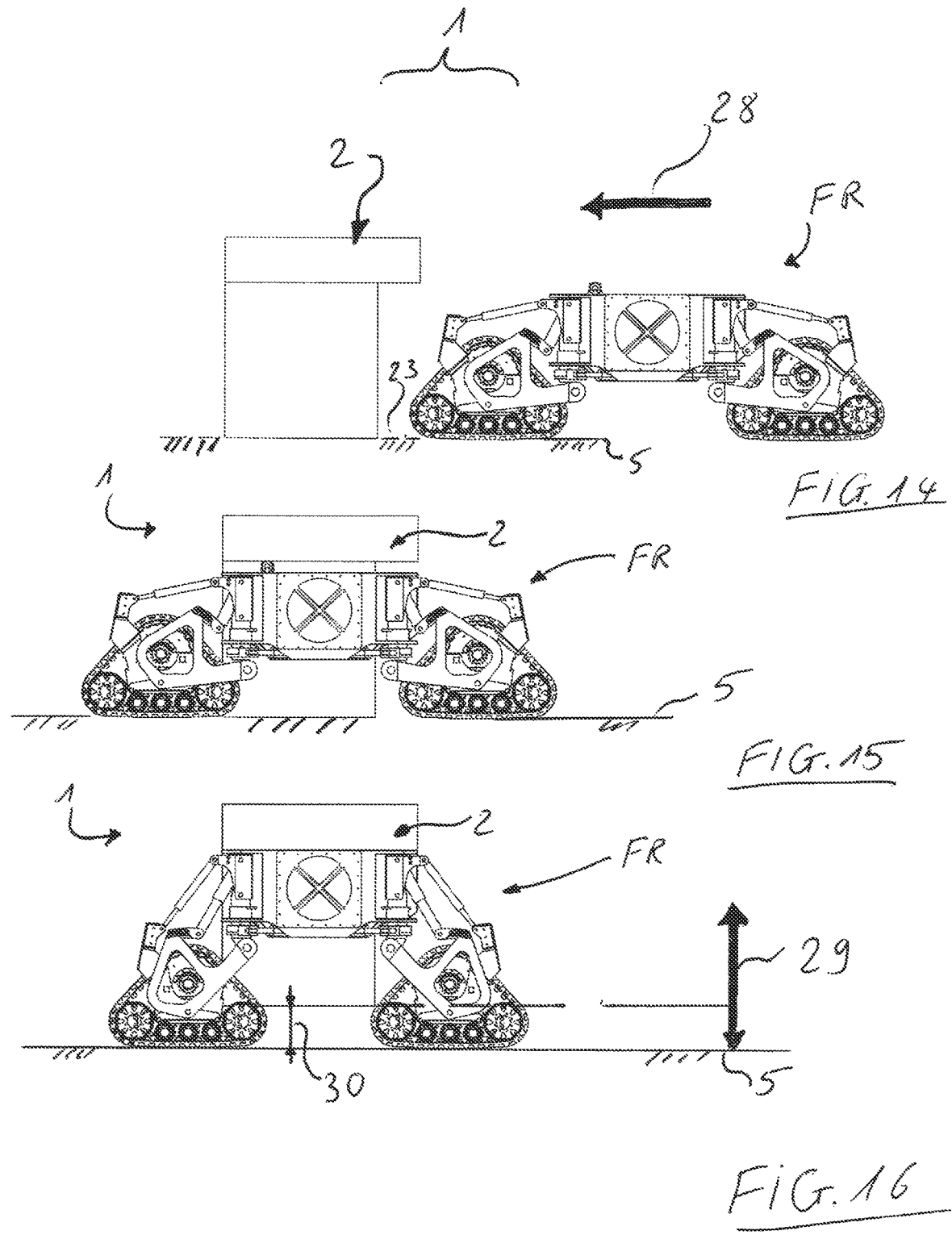
FIG. 14 to FIG. 16 show respective phases of movements of the functional frame during connection to an attachment device.

From the basic representations according to FIG. 14 to FIG. 16 it is clear that the functional frame FR according to the invention can cooperate as an independently movable unit with the respective attachment device 2. In FIG. 14 a travel movement of the functional frame FR towards the attachment device 2 fixedly held on the ground 5 is indicated with an arrow 28. The connecting position envisaged with the receiving space 10 (FIG. 10)—on the base carrier 6'—is achieved in the position shown in FIG. 15. It is therefore clear that respective controllable positioning and/or coupling movements of the functional frame FR can be executed for the connection—or subsequently conceivably release—of the at least one attachment device 2. In this connection basically any driving, pushing, lifting and/or pivoting movements are conceivable for the coupling or uncoupling of system components.

In FIG. 16 an additional lifting movement for the positioning of the attachment device 2 at a height 30 above the ground 5 is indicated with an arrow 29. The system concept of the functional frame FR according to the invention is directed so that it can be optimally connected in the region of its respective connection points (for example: 20, 20') in basically any arbitrary configuration to agricultural equipment types. In this connection systems are conceivable in which the functional frame FR as a whole is operated as an autonomous unit predominantly without an operator.

Figure 17:
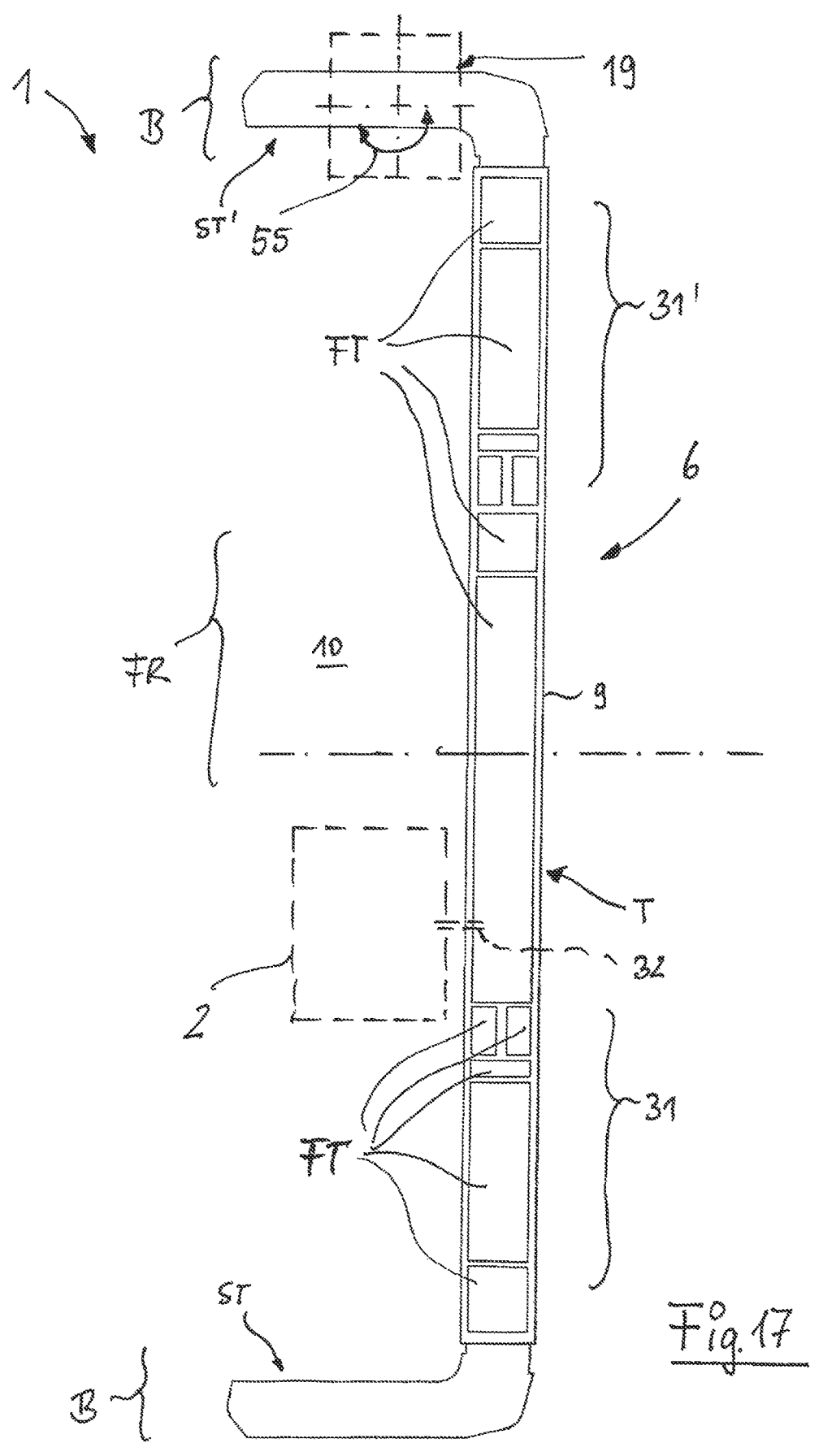
Figure 18:
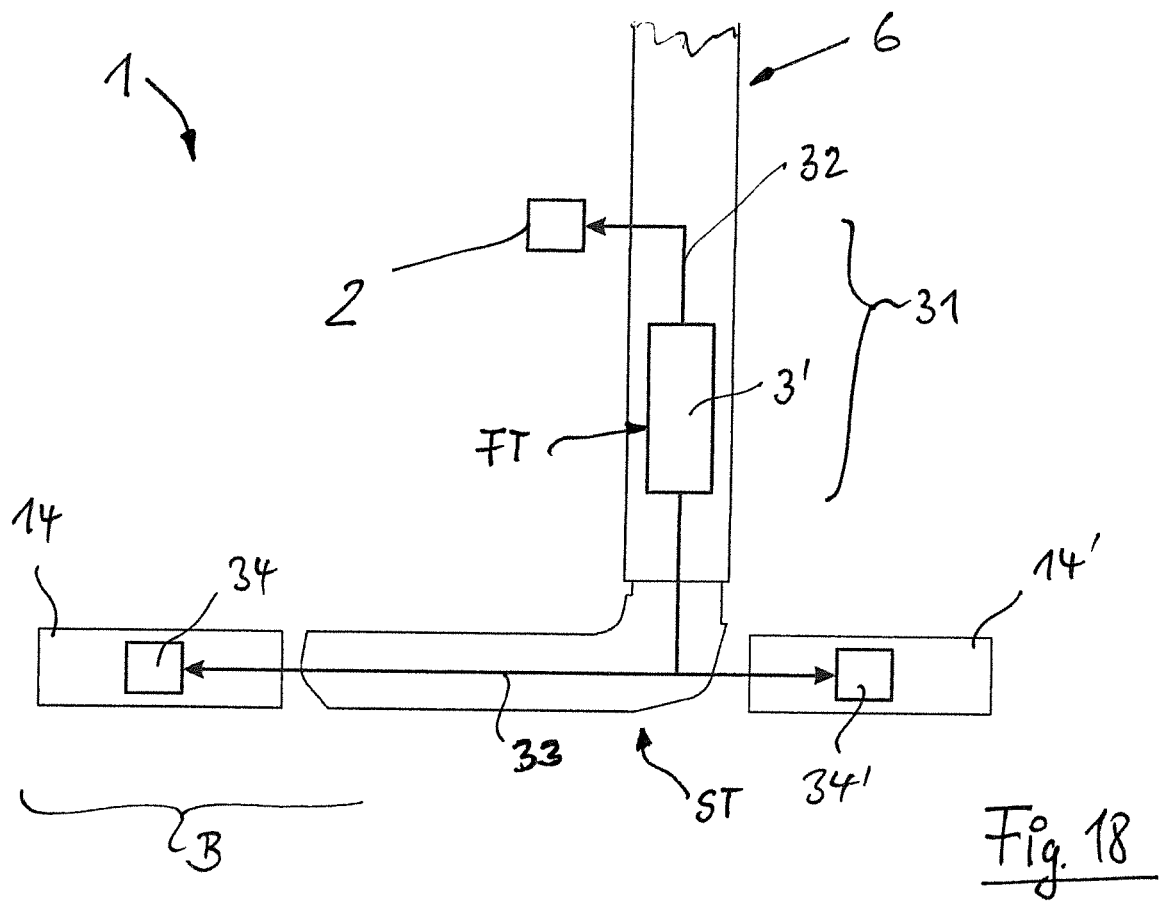
FIG. 18 and FIG. 19 are respective detailed representations of assemblies of the drive and of the ventilation of the system.

The structural conversion of the overall concept according to FIG. 2 leads to an integrated construction in the region of the base carrier 6, as is shown by way of example in FIG. 17. In this case it is clear that a "double" power supply with two substantially symmetrical units 31, 31' is preferably provided in the region of the base carrier 6. From the detailed representation according to FIG. 18 it is clear that the power supply unit 31 is provided with a drive unit 3', which is guided via a drive train 32 to the at least one attachment device 2. On the other hand the drive unit 3' can be implemented in such a way that a respective travelling drive 34, 34' can be activated in the region of the tracks 14, 14' by means of the connection 33.

Figure 19:
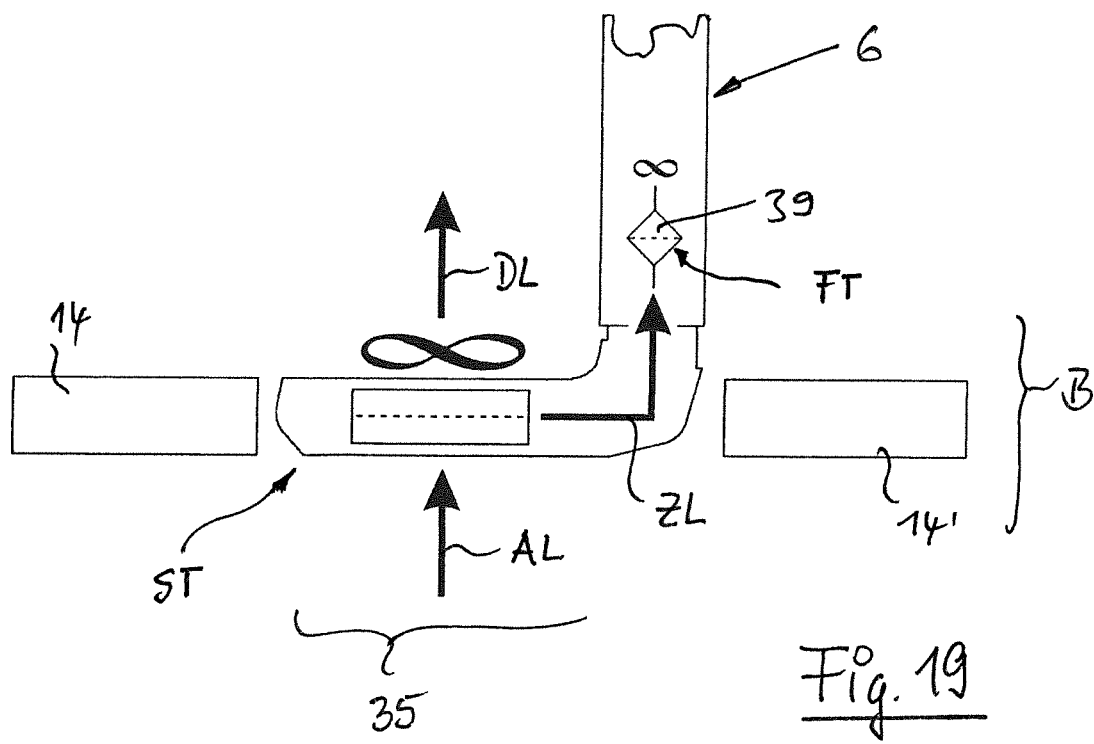

From a further detail illustration according to FIG. 19 it is clear that the drive concept described above can also be connected to a cooler/fan system 35. This cooler/fan system 35 integrated in particular in the region of the side supports ST, ST', is so arranged with respect to the working space of the system that comparatively clean intake air AL can be drawn into the system. Apart from the cooling of drive units, the contamination of further assemblies can be effectively avoided with this drawn-in air. In this connection variable deflections of the compressed air DL towards the region of the attachment device devices 2 are provided. The concept of the largely closed base carrier 6 can also be provided with additional lines ZL, so that further partial air flows can be used in the interior of the base carrier 6.

Figure 21:
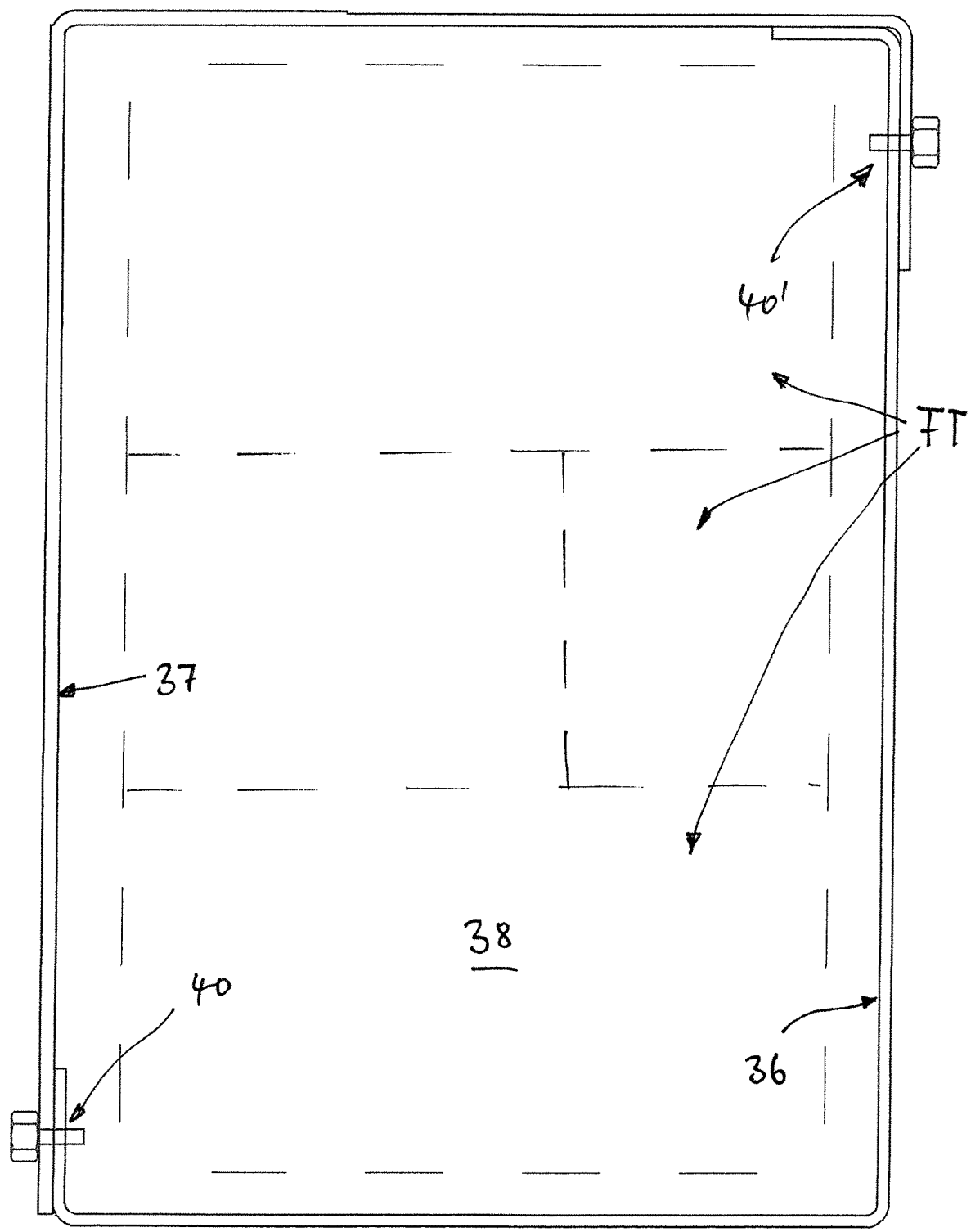
FIG. 21 is a cross-sectional view of the base carrier.
Figure 22:
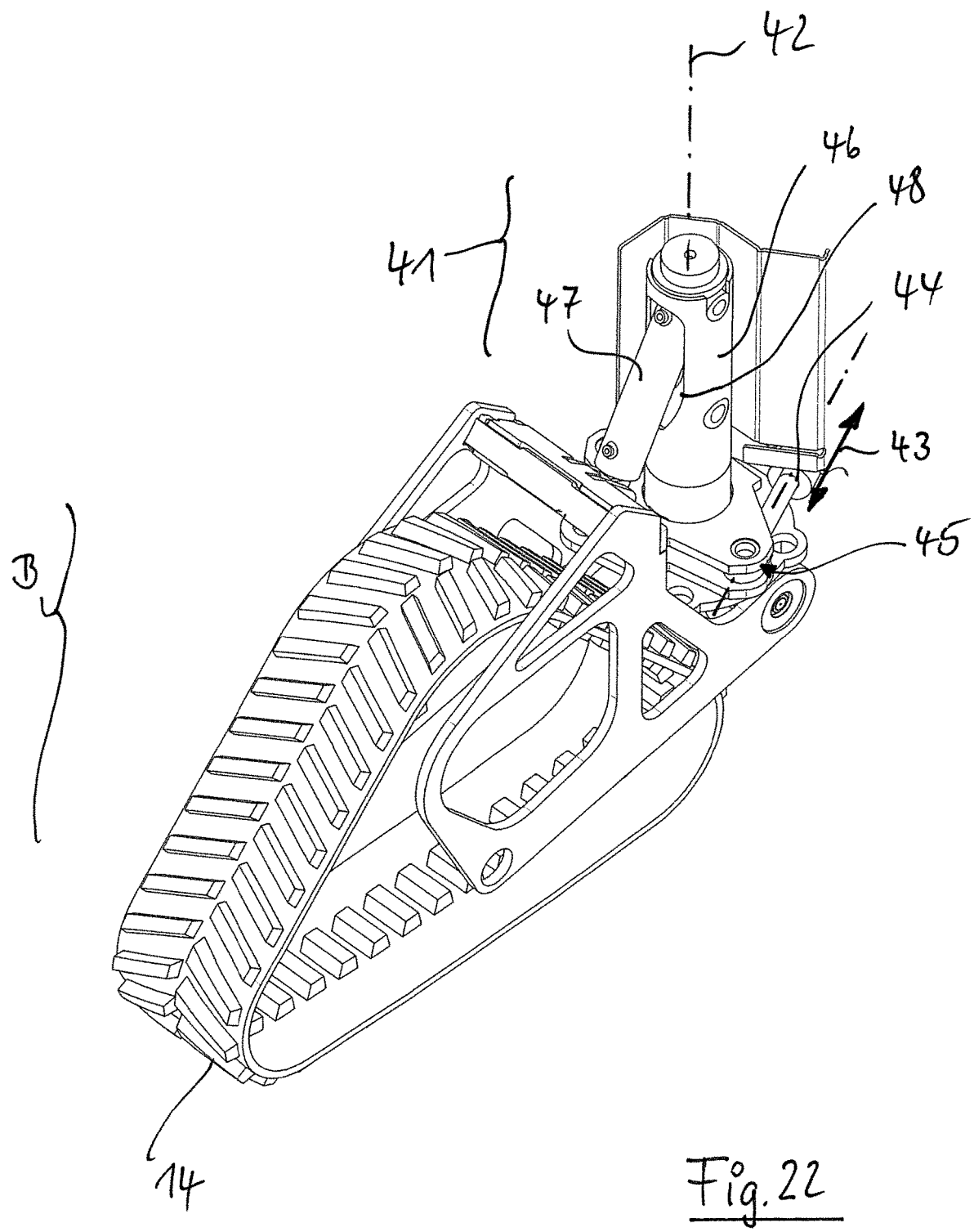
FIG. 22 to FIG. 26 show respective detailed representations of steering and support assemblies in the region of the drive caterpillars.
Figure 23:
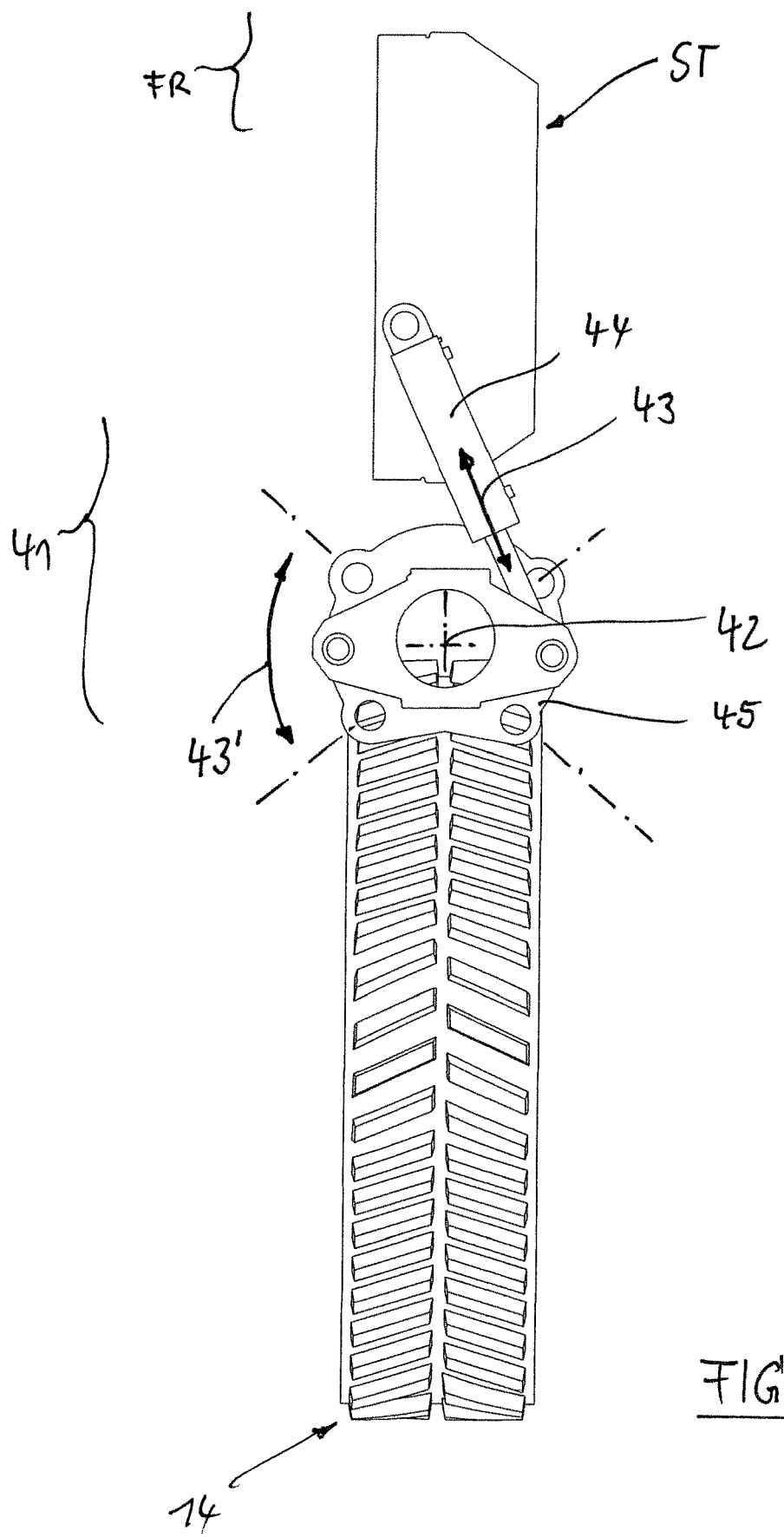

FIG. 21 shows a basic representation of the cross-sectional structure of the base carrier 6, wherein this defines an interior space 38 surrounded at least in regions by contour plates 36, 37 and accommodating functional parts FT (FIG. of the system.

As already discussed in conjunction with FIG. 19, an excess pressure can be generated in this interior 38 by means of the cooler/fan system 35, wherein additional air guides 39 are also conceivable. The interior 38 is defined in such a way that the drive train 32 for the at least one attachment device 2 can be led out from the interior.

Figure 20:
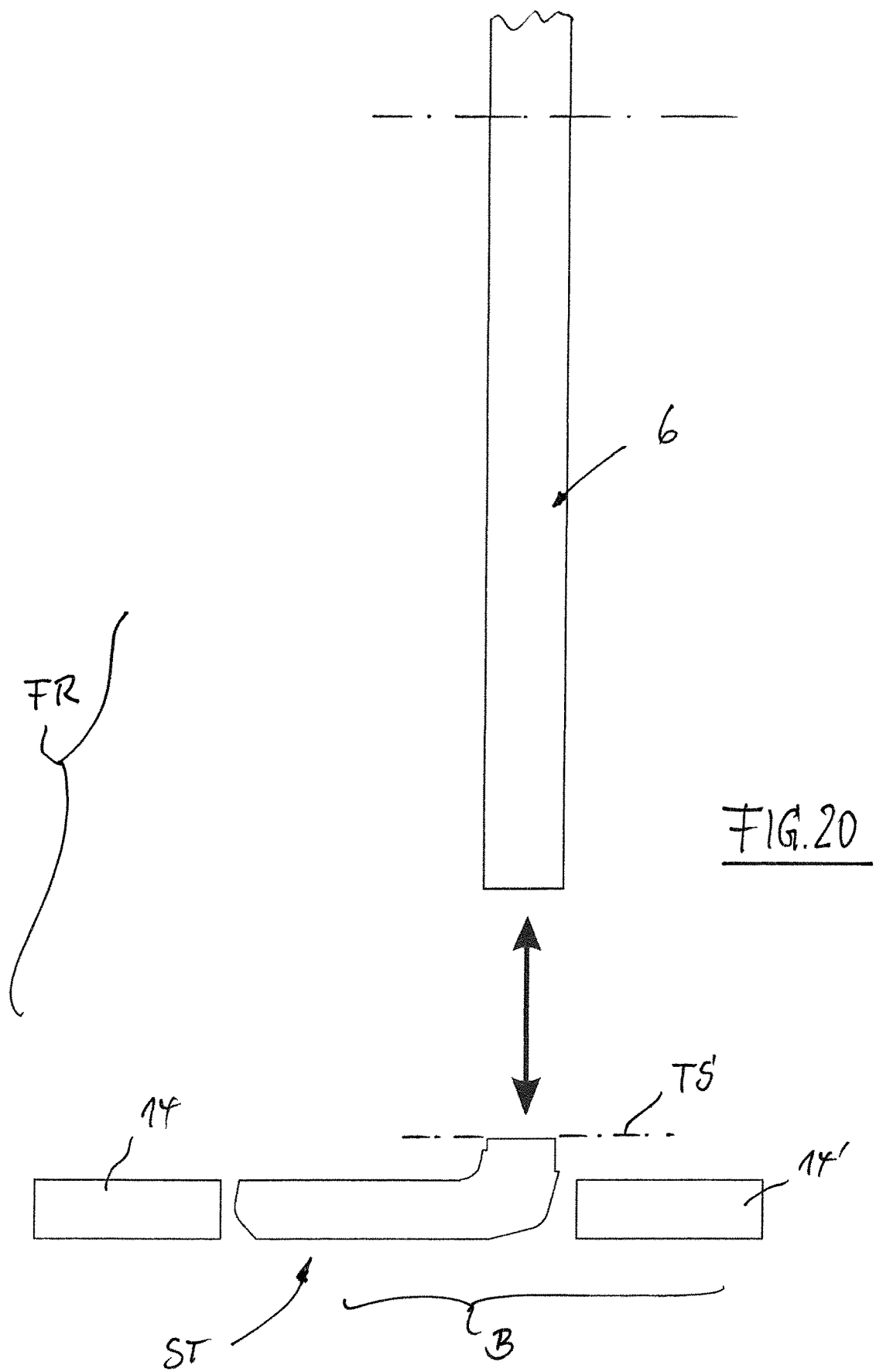
FIG. 20 is a schematic diagram of the division of the modular system.

In this connection the functional frame FR is designed as a modular unit both in the details according to FIG. 21 and also the individual assemblies. The contour plates 38, 39 are designed via releasable connections 40, 40' in such a way that, if necessary, mounting openings for the inner units can be released without any problem. In FIG. 20 the modular construction is shown in the region of the side supports ST, wherein it is clear that the base carrier 6 can be separated from further assemblies in the region of a dividing plane TS and a division which is optimal for transport purposes is thus achievable.

Figure 24:
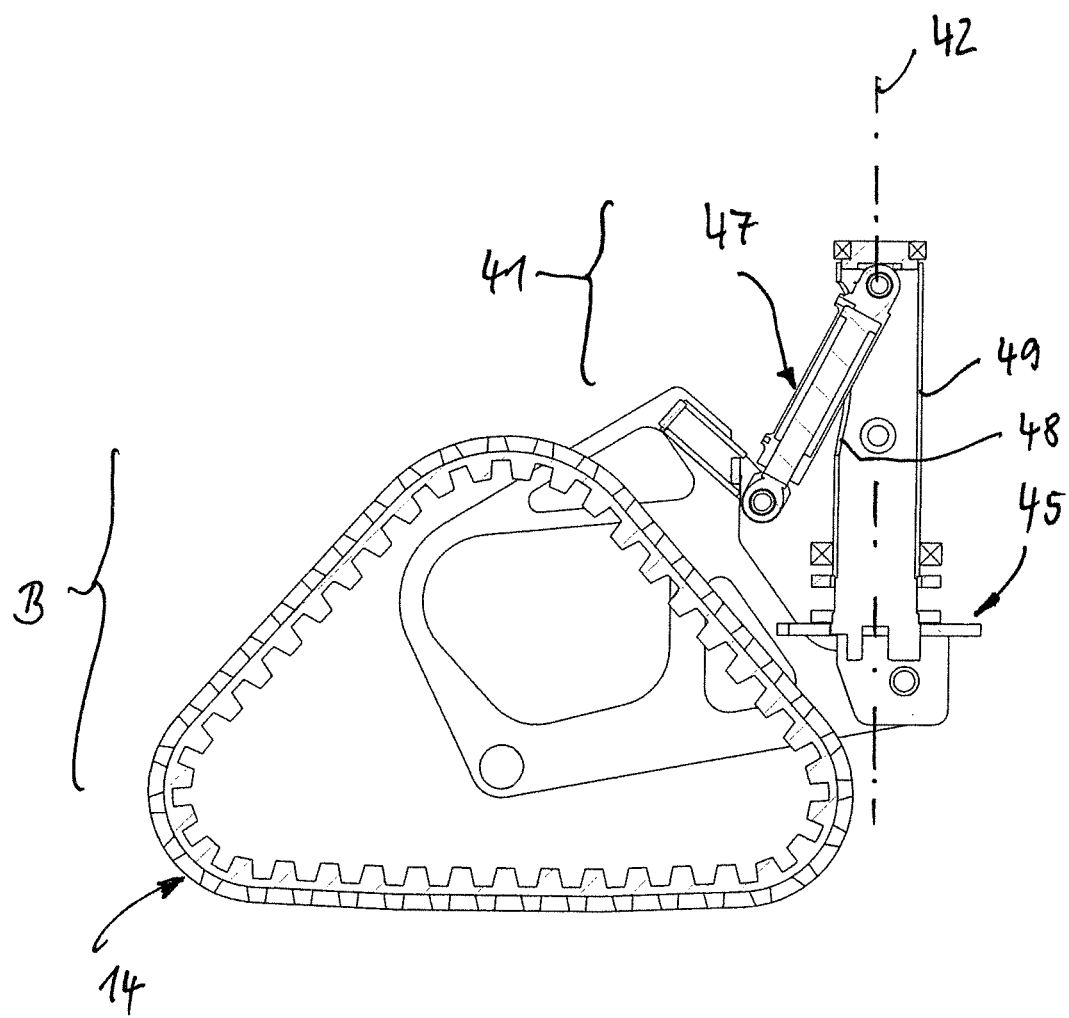

Structural configurations in the region of the respective ground supports B, B' are shown in the representations according to FIG. 22 to FIG. 26. It is clear in this case that the support construction 41 defines a vertical axis 42 about which the driving track 14 can be swiveled in such a way that the afore-described different use or driving positions can be achieved. By means of a corresponding lifting movement in the direction of the arrow 43, an adjustment movement in the region of a steering disc 45 can be realised by means of a steering cylinder 44, so that corresponding latching elements enable a fixing in the intended position. In addition to this adjustment system a steering shaft 46 is provided in the region of the vertical axis 42, which cooperates with a lifting cylinder 47 that is introduced into the steering shaft in the region of an access opening 48. With this support system, in particular high driving and compressive loads can be absorbed in the region of the ground supports B, B'. In FIG. 24, the above-described system with the parts in the region of the steering disc 45 and of the lifting cylinder in the region of the steering shaft is illustrated again in a cross-sectional illustration.

Figure 25:
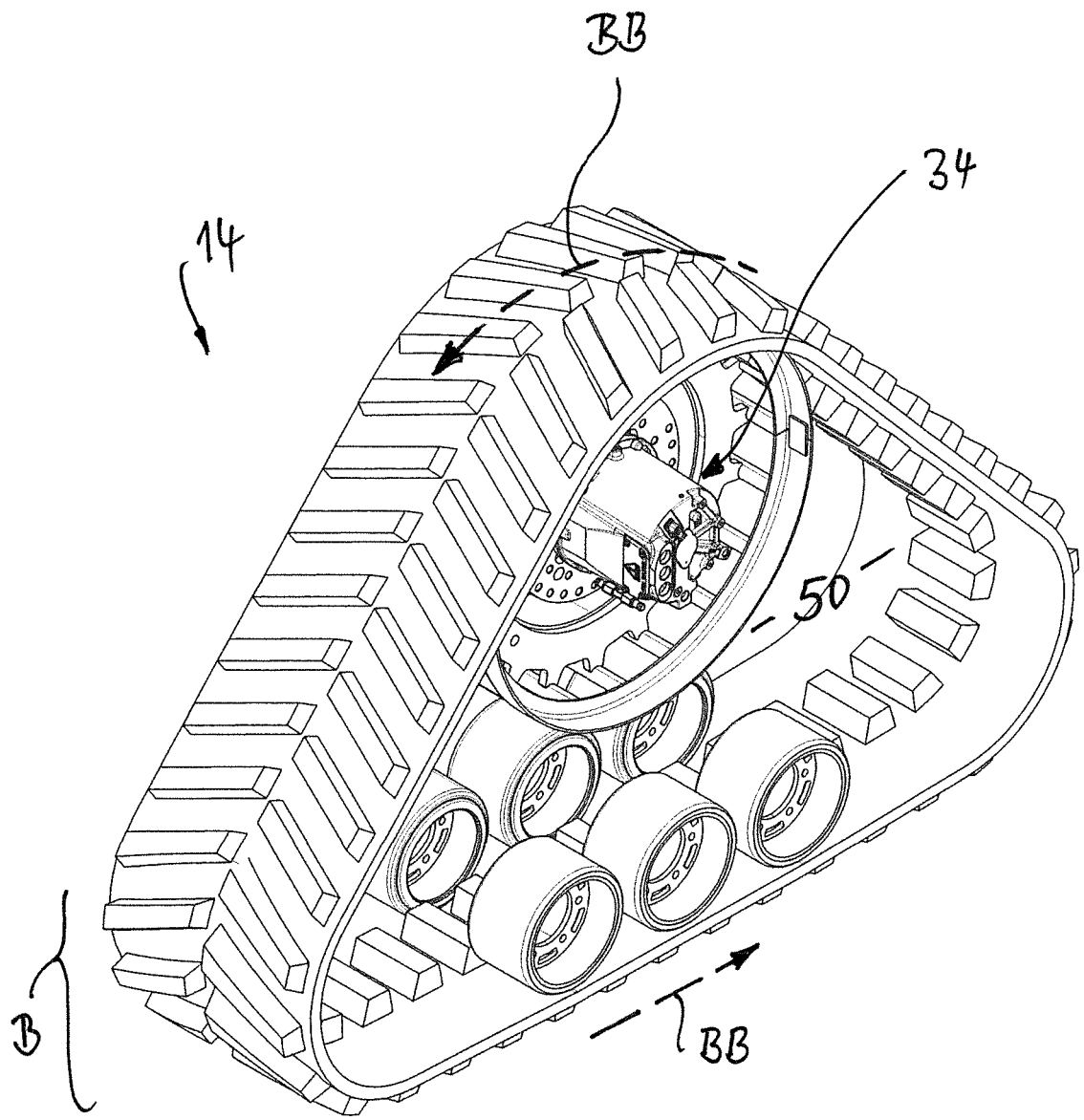
Figure 26:
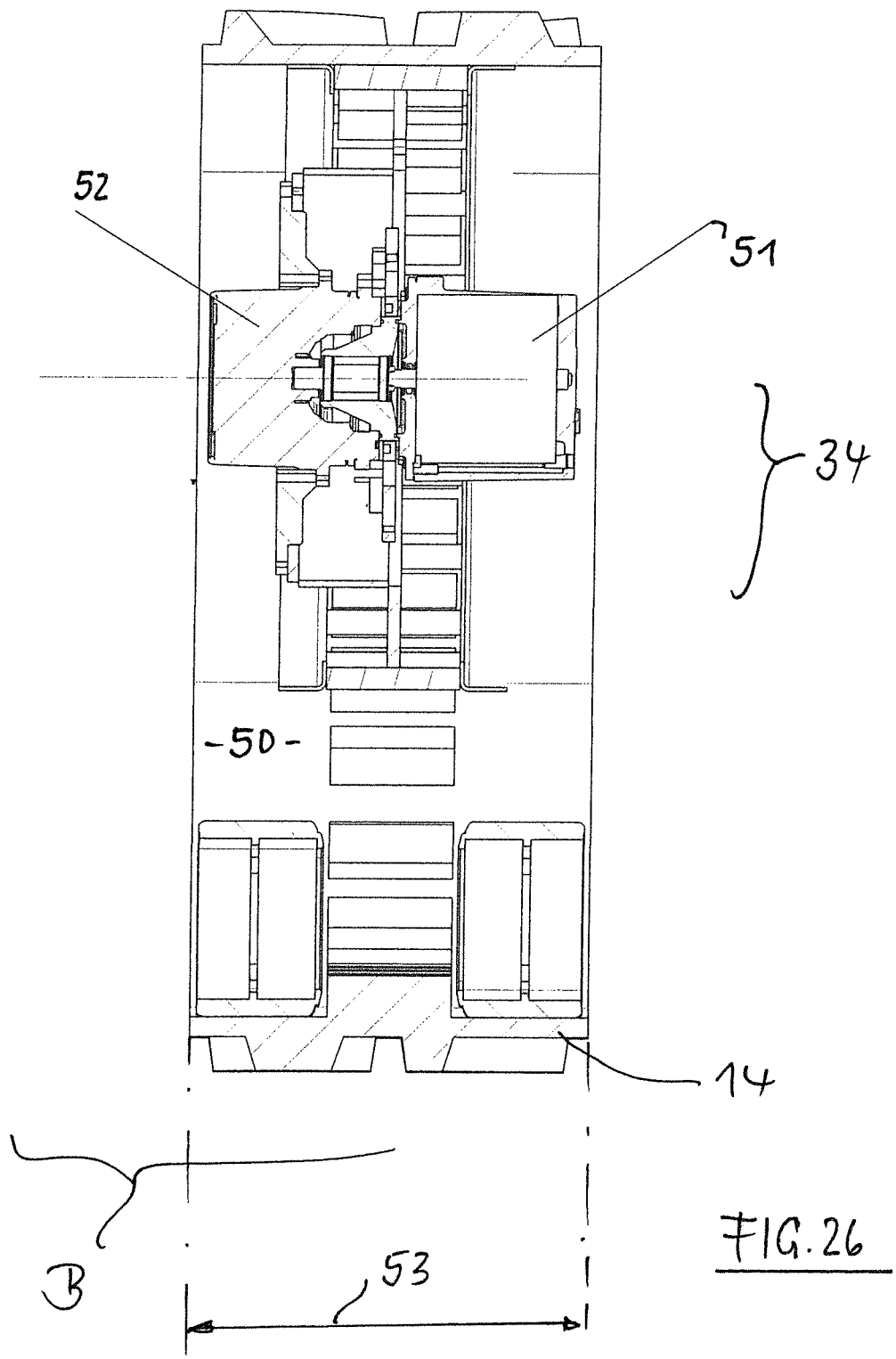

The detailed structure in the region of the drive 34 will become clear from the illustrations in FIG. 25 and FIG. 26. The driving track 14 shown in perspective in FIG. 25 defines a supporting space 50 defined by its movement path BB, in which an electric motor 51 with a planetary gear 52 is provided as the drive 34. It is clear from FIG. 26 that this assembly extends in the region of the drive 34 without overhang under the width 53 of the driving track 14.

Figure 27:
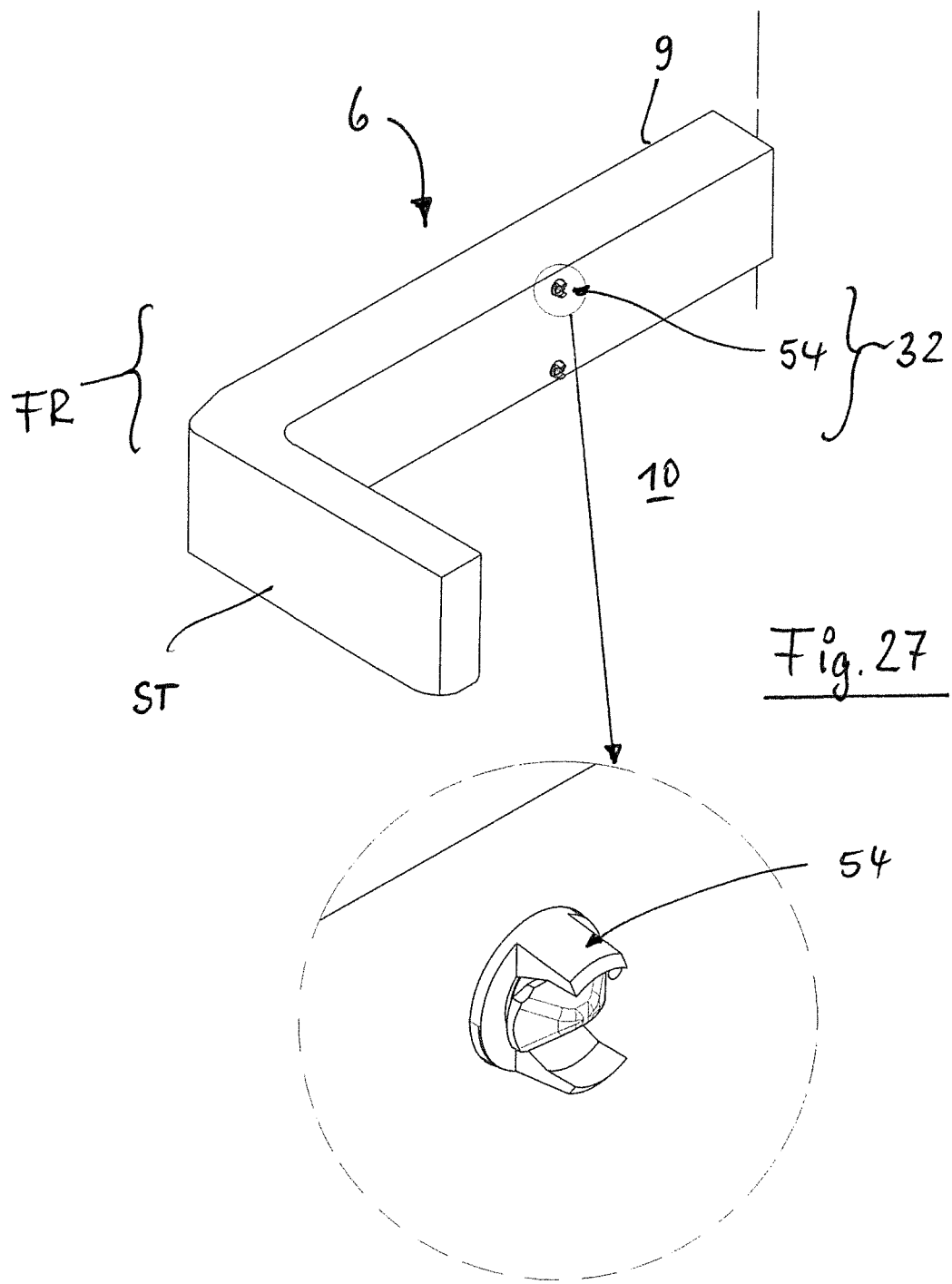
FIG. 27 is a sectional view in the region of a twist-lock connection for attachment devices.

FIG. 27 shows a further detail in the connecting region 32 for the attachment device 2. In this case provision is made so that the base carrier 6 is designed in the region of respective twist-lock connectors 54 for a largely automatic coupling of attachment devices 2. A further advantageous embodiment of the system envisages that the driver's cab 19 (FIG. 17) in the region of its support connection to the functional frame FR, permits a pivoting according to the arrow 55.

The invention claimed is:

1. A self-propelled machine for agriculture forming an agricultural gantry system, comprising:
   at least one drive unit with a control module;
   a support structure forming an agricultural gantry system for variable work tasks comprising:
      a functional frame having a base carrier and a side carrier coupled to the base carrier; and
      a plurality of ground supports each disposed at a respective longitudinal end of the base carrier, the side carrier extending from at least one longitudinal end of the base carrier in a direction perpendicular to a longitudinal direction of the base carrier,
      wherein each of the ground supports is pivotally connected to the functional frame by a vertical pivot axis, two of the ground supports being pivotally connected to the functional frame with the vertical pivot axis being disposed generally on a longitudinal axis of the base carrier;
   wherein the support structure is configured to be converted from a road orientation defining a driving width to a working orientation having a working width larger than the driving width, the ground supports pivoting about the vertical pivot axis to convert the support structure from the road orientation to the working orientation, and
   wherein the base carrier defines an interior space, and the at least one drive unit is arranged in the interior space.

2. The self-propelled machine of claim 1, wherein at least one of the ground supports being pivotally connected to the functional frame with the vertical pivot axis being disposed generally on a length axis of the side carrier.

3. The self-propelled machine of claim 1, wherein the working width is defined by a longitudinal length of the base carrier plus a width of the side carrier and the ground supports are disposed within the working width when the support structure is in the working orientation.

4. The self-propelled machine of claim 1, wherein the working width is defined by a length between outermost ends of the functional frame in the longitudinal direction of the base carrier and the ground supports are disposed within the working width when the support structure is in the working orientation.

5. The self-propelled machine of claim 1, wherein the driving width is defined by a length between outermost ends of the functional frame in the direction perpendicular to the longitudinal direction of the base carrier and the ground supports are disposed within the driving width when the support structure is in the road orientation.

6. The self-propelled machine of claim 1, wherein the functional frame has two side carriers, each of the side carriers is coupled to one of the respective longitudinal ends of the base carrier.

7. The self-propelled machine of claim 1, wherein the base carrier has a plurality of contour plates, the interior space is surrounded at least in regions by the contour plates.

8. The self-propelled machine of claim 7, wherein the side carriers are provided in modular segments, the modular segments are provided in the region of the contour plates, and the side carriers are detachable from the base carrier.

9. The self-propelled machine of claim 1, wherein the base carrier is asymmetric and is equipped with at least one power supply unit being provided in the base carrier, wherein the power supply unit is provided with the at least one drive unit.

10. The self-propelled machine of claim 9, wherein the at least one power supply unit is connected to at least one cooler/fan system, wherein an excess pressure is generated in the interior space by the at least one cooler/fan system.

11. The self-propelled machine of claim 1, wherein the each vertical pivot axis is aligned with a plane defined within a movement path of a caterpillar track of the each ground support, and the each vertical pivot axis is offset from the plane.

12. A self-propelled machine for agriculture forming an agricultural gantry system, comprising:
   at least one drive unit with a control module;
   a support structure forming an agricultural gantry system for variable work tasks comprising:
      a functional frame having a base carrier and a side carrier coupled to the base carrier; and
      a plurality of ground supports each disposed at a respective longitudinal end of the base carrier, the side carrier extending from at least one longitudinal end of the base carrier in a direction perpendicular to a longitudinal direction of the base carrier,
      wherein each of the ground supports is pivotally connected to the functional frame by a vertical pivot axis;
   wherein the support structure is configured to be converted from a road orientation defining a driving width to a working orientation having a working width larger than the driving width, the ground supports pivoting about the vertical pivot axis to convert the support structure from the road orientation to the working orientation;

wherein a length of the side carrier defines the driving width and the ground supports are disposed within the driving width when the support structure is in the road orientation, and wherein the base carrier defines an interior space, and the at least one drive unit is arranged in the interior space.

13. The self-propelled machine of claim 12, wherein a length of the base carrier defines the working width and the ground supports are disposed within the working width when the support structure is in the working orientation.

14. The self-propelled machine of claim 12, wherein the working width is defined by a longitudinal length of the base carrier plus a width of the side carrier and the ground supports are disposed within the working width when the support structure is in the working orientation.

15. The self-propelled machine of claim 12, wherein the working width is defined by a length between outermost ends of the functional frame in the longitudinal direction of the base carrier and the ground supports are disposed within the working width when the support structure is in the working orientation.

16. The self-propelled machine of claim 12, wherein the driving width is defined by a length between outermost ends of the functional frame in the direction perpendicular to the longitudinal direction of the base carrier and the ground supports are disposed within the driving width when the support structure is in the road orientation.

17. A self-propelled machine for agriculture forming an agricultural gantry system, comprising:
at least one drive unit with a control module;
a support structure forming an agricultural gantry system for variable work tasks comprising:
a functional frame having a base carrier and at least one side carrier coupled to the base carrier; and
a plurality of ground supports each disposed at a respective longitudinal end of the base carrier, the side carrier extending from at least one longitudinal end of the base carrier in a direction perpendicular to a longitudinal direction of the base carrier, wherein each of the ground supports is pivotally connected to the functional frame by a vertical pivot axis;

wherein the support structure is configured to be converted from a road orientation defining a driving width to a working orientation having a working width larger than the driving width, the ground supports pivoting about the vertical pivot axis to convert the support structure from the road orientation to the working orientation;

wherein in the road orientation, two of the ground supports are aligned with a longitudinal axis of the base carrier and, in the working orientation, two of the ground supports are aligned with a length axis of the side carrier, and wherein the base carrier defines an interior space, and the at least one drive unit is arranged in the interior space.

18. The self-propelled machine of claim 17, wherein the working width is defined by a longitudinal length of the base carrier plus a width of the side carrier and the ground supports are disposed within the working width when the support structure is in the working orientation.

19. The self-propelled machine of claim 17, wherein the working width is defined by a length between outermost ends of the functional frame in the longitudinal direction of the base carrier and the ground supports are disposed within the working width when the support structure is in the working orientation.

20. The self-propelled machine of claim 17, wherein the driving width is defined by a length between outermost ends of the functional frame in the direction perpendicular to the longitudinal direction of the base carrier and the ground supports are disposed within the driving width when the support structure is in the road orientation.

\* \* \* \* \*